United States Patent
Ouimette et al.

(10) Patent No.: US 11,542,011 B1
(45) Date of Patent: *Jan. 3, 2023

(54) ENHANCED ABANDONED CALL RECOVERY FOR A CONTACT CENTER

(71) Applicant: Noble Systems Corporation, Atlanta, GA (US)

(72) Inventors: Jason P. Ouimette, Berkeley Lake, GA (US); Jason S. Conner, Stockbridge, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 316 days.

This patent is subject to a terminal disclaimer.

(21) Appl. No.: 16/856,395

(22) Filed: Apr. 23, 2020

Related U.S. Application Data

(63) Continuation of application No. 15/586,524, filed on May 4, 2017, now Pat. No. 10,674,011.

(51) Int. Cl.
| | |
|---|---|
| *H04M 3/42* | (2006.01) |
| *B64D 11/04* | (2006.01) |
| *E03F 1/00* | (2006.01) |
| *F16K 31/126* | (2006.01) |
| *F16K 37/00* | (2006.01) |
| *B64D 11/02* | (2006.01) |
| *E03C 1/23* | (2006.01) |

(52) U.S. Cl.
CPC ............ *B64D 11/04* (2013.01); *E03F 1/006* (2013.01); *F16K 31/1262* (2013.01); *F16K 31/1266* (2013.01); *F16K 37/0041* (2013.01); *H04M 3/42195* (2013.01); *B64D 11/02* (2013.01); *E03C 2001/2311* (2013.01); *E03C 2001/2313* (2013.01); *E03C 2001/2317* (2013.01)

(58) Field of Classification Search
None
See application file for complete search history.

(56) References Cited

U.S. PATENT DOCUMENTS

| | | | |
|---|---|---|---|
| 2010/0158236 A1* | 6/2010 | Chang | H04M 3/5175 379/265.03 |
| 2012/0027194 A1* | 2/2012 | Deshpande | H04M 3/493 379/265.01 |

* cited by examiner

*Primary Examiner* — Quynh H Nguyen
(74) *Attorney, Agent, or Firm* — Blank Rome LLP

(57) ABSTRACT

An enhanced abandoned call recovery ("E-ACR") process allows certain abandoned calls to be eligible for a callback call. An E-ACR assignment point defines which abandoned calls in an inbound campaign or interactive voice response ("IVR") menu are eligible to be processed to determine whether the E-ACR callback should occur. The determination of whether a callback occurs involves various compliance tests, such as ensuring calling window, call attempts, and other regulatory concerns are addressed. Once a callback is determined to occur, it is associated with a specific campaign to ensure the called party is provided with agents having the skill set as defined for that assignment point. In this manner, only eligible callers receive an E-ACR callback, and further receive the callback in a compliant manner and handled by the same skill set of agents as would have been allocated to the caller had they not abandoned their call.

20 Claims, 11 Drawing Sheets

ENHANCED ABANDONED CALL RECOVERY FOR A CONTACT CENTER

RELATED PATENT APPLICATIONS

This application is a continuation of U.S. patent application Ser. No. 15/586,524 filed on May 4, 2017, the contents of which is incorporated by reference for all that it teaches.

FIELD OF THE DISCLOSURE

The concepts and technologies disclosed herein generally pertain to automatic initiation of an outbound call from a contact center to a telephone number of a previously abandoned call.

BACKGROUND OF THE INVENTION

Contact centers are often configured to receive inbound calls for various applications. Enterprises may advertise toll free numbers (so-called '800' numbers) for various purposes, such as for customer service, ordering, returns, handling inquiries, etc. To maximize the utilization of agents, inbound callers may be placed in a queue or hold state if an agent is not available. This may occur after the call is automatically answered and placed in a queue by an automatic call distributor or by an interactive voice response ("IVR") system. The caller may first hear a message provided by the IVR, which may inform the caller of the anticipated wait time. For various reasons, callers may terminate the call (i.e., abandon the call) while on hold. This may be due to impatience by the caller waiting on hold, the caller having a change of mind, or a decision by the caller to pursue the call at a later time. Depending on the nature of the call, the contact center operator may find that an abandoned call results in a drop of revenues, and can have significant financial impacts. For example, a toll free number may be advertised by an enterprise for ordering goods. Thus, calls to that number represent potential orders, and any abandoned calls from callers on hold may result in lost revenue.

Contact centers have to balance providing acceptable wait times to their callers while maximizing utilization of their agents. Typically, these goals are at odds. An increase of agent utilization frequently causes longer wait times, and reducing caller wait times decreases agent utilization. For example, some contact centers may use an "80/20" rule where 80% of the callers are connected to an agent within 20 seconds of waiting. Determining an average acceptable holding time for callers is difficult, and regardless of what may deemed to be an "optimal" value, some callers will still abandon their calls while on hold.

Eliminating caller abandonment while the caller is on hold can be accomplished by simply eliminating placing any call on hold. However, this would require an unacceptably large number of agents. Given that a contact center cannot practically eliminate abandoned calls, the contact center may incorporate some mechanism to mitigate the impact of abandoned calls. One mechanism for mitigating the impact is to institute a "callback." This is a process by which the contact center will initiate an outbound call (called the "callback call" or simply "callback") to that caller and connect the callback call to an agent. In the past, a relatively simple mechanism could be used for originating callback calls, but such mechanisms were not compatible with various regulations and other compliance requirements that contact centers are now required to follow. Thus, enhanced procedures for originating callback calls to abandoned calls are required.

SUMMARY

Various embodiments are disclosed for providing a callback call to a caller by a contact center who has abandoned a call and providing the callback call in an efficient, compliant, and flexible manner. In one embodiment, a series of determinations are made with respect to various criteria to determine whether a callback call should be automatically originated to the telephone number of a prior abandoned inbound call.

As is discussed in greater detail below, the subject matter disclosed herein may be implemented as a computer-controlled apparatus, a method, a computing system, or as an article of manufacture such as a tangible, non-transitory computer-readable storage medium. These and various other features will be apparent from the following Detailed Description and the associated drawings.

This Summary is provided to exemplify concepts at a high level that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
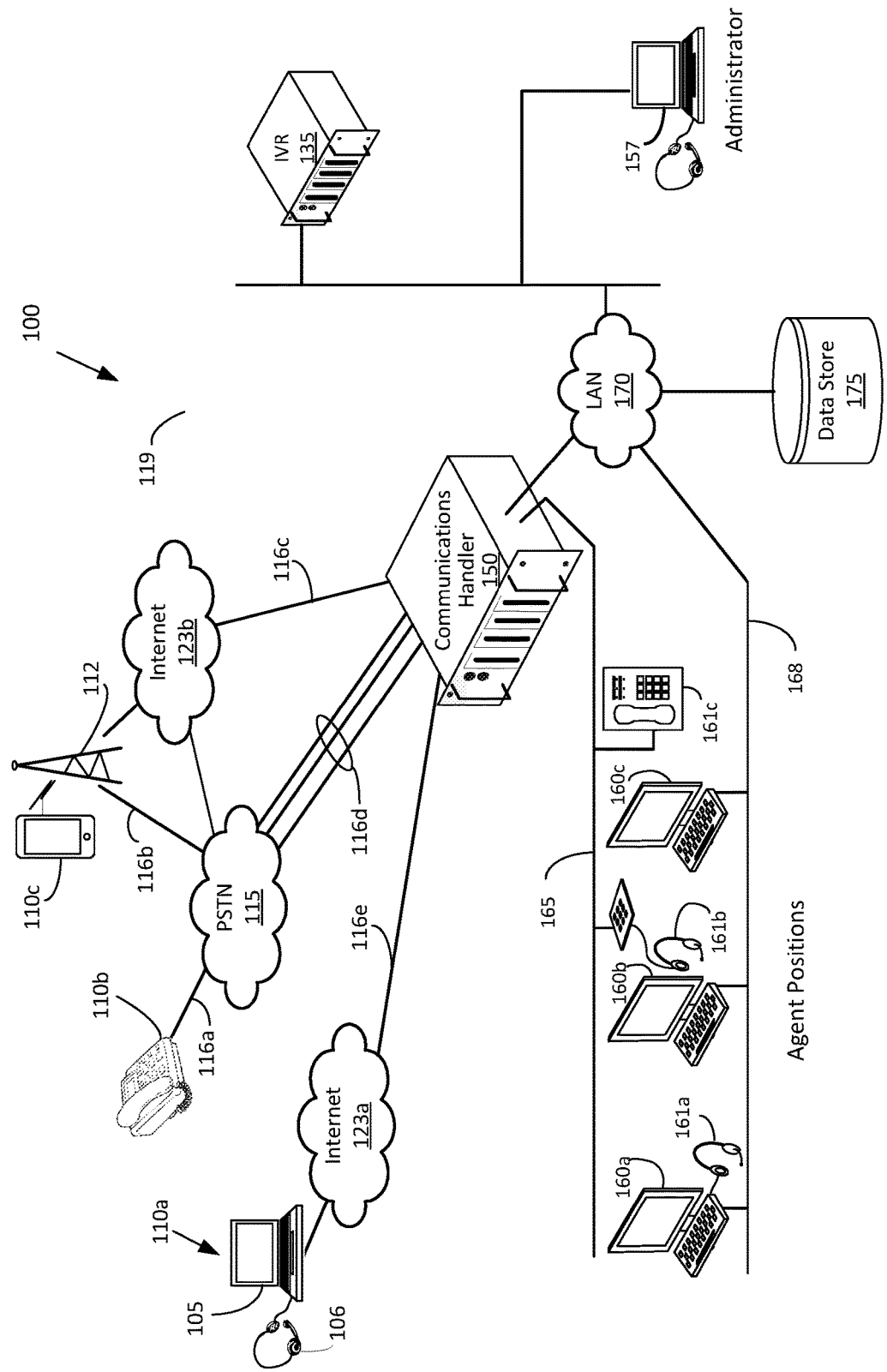
FIG. 1 illustrates one embodiment of an architecture of a contact center for practicing the concepts and technologies disclosed herein.

Contact centers attempt to balance call holding times for inbound calls with agent utilization. Some contact center may use an "80/20" rule where 80% of the callers are connected to an agent within 20 seconds. Various combinations are possible, but to design a contact center to connect more than 80% of the callers within 20 seconds, or connected 80% of the callers in fewer than 20 seconds, requires staffing additional agents. However, optimizing one (less wait time for a caller) usually comes at the expense of the other (staffing additional agents). Thus, staffing sufficient number of agents to handle a peak calling time may result in the agents being idle at other times. Thus, it can be expected that some callers will encounter a wait, and of those callers, some inbound callers who have been placed in a waiting queue will abandon the call. In other cases, callers who are interacting with an automated system may, for whatever reason, abandon the call as well. In either situation, the abandon call may represent lost revenue to the contact center, and/or a lower perception of customer service by the caller.

To mitigate the impacts of abandoned calls, the contact center may attempt to originate a callback to the caller. In some cases, the contact center may schedule a callback call while the caller is on hold by connecting the caller to an interactive voice response system to schedule the callback. Then, either the caller or the contact center terminates the call and the callback call occurs at a later time. In this situation, the terminated call is not considered abandoned.

An abandoned call in this case refers to a caller on hold or is interacting with the IVR menu (for other reasons than scheduling a callback call), who then terminates the call, usually in an unexpected manner. In this case, a callback call is made to the abandoned caller, when there is no pre-determined callback call agreed to or scheduled. Thus, the callback call is made to an abandoned caller. For the remainder of this discussion, reference to a "callback call" refers to originating a callback call to the abandoned caller, not to a pre-agreed-to callback call. This distinction is significant, since a callback call to an abandoned calling party does not have the some context as a callback call to a party who has not abandoned the call. Specifically, in the former case, the calling party has not agreed to a callback call whereas in the latter case, the calling party is expecting a callback call.

The callback call to the abandoned calling party (a.k.a. referred to herein as the "caller" or "abandoning caller") is possible if the telephone number of the calling party is known. The telephone number of the calling party is frequently known by the conveyance of the calling party's telephone number to the contact center. The calling party's telephone number is also sometimes referred to as "automatic number identification" or "ANI" to those skilled in the art of telephony (in part because it is provided to the called party automatically for purposes of identifying the calling party). While the ANI is not always provided by the telecom carrier to the contact center, in many cases it is provided, and therefore known to the contact center. In some instances, the ANI may not be provided, but the caller has provided other information which may allow the ANI to be retrieved from a customer account.

In days past, the contact center could mitigate the impact of an abandoned call simply by originating a callback call to the caller, using the ANI. However, contact centers are more sophisticated, and may have different groups of agents assigned to handle different types of calls. Simply originating a callback call without knowing which group of agents is to handle the call is unlikely to provide the level of customer service expected by the caller. The callback call should be assigned to an agent able to assist the caller, else the call will have to be transferred to another agent.

Further, originating a call to the ANI without further analysis may not be suitable in the current regulatory environment, as there are various compliance oriented regulations that must be followed. In some cases, ensuring compliance can be difficult, and various checks may have to be performed. Further, it may not always be possible to ensure compliance with all regulations in a timely manner in order to accomplish a callback call. Thus, it may not be possible to even perform the callback call in a manner that involves an acceptable level of risk to the contact center operator. This requires the contact center to balance the desire to communicate with the caller with the risk of potential non-compliance. In order for a contact center to perform this balance, flexibility is required in provisioning and configuring the systems which automatically perform the callback call. This allows the contact center operator to determine under which particular situations the callback call will occur.

Determination of Whether a Callback Call should be Attempted

While a contact center may desire to mitigate every instance of an abandoned call, this may not be possible or practical in many instances. There are a number of factors that a contact center may take into account in determining whether a callback call should be initiated or even can be initiated.

One simple reason why a callback call may not be initiated is that the ANI may not have been provided to the contact center when the inbound call was originally received. Thus, the telephone number of the caller who abandoned the call may be unknown. In some cases, the telephone number may not be available or may be withheld by choice by the originating caller or by the originating carrier. These tend to be the exceptions rather than the norm.

Assuming the ANI is known to the contact center, a relative importance (i.e., "value") of the call or caller may be known. A contact center may assign a relative value, which may be determined in various ways, to the caller. For example, an airline may assign a status to its frequent fliers based on their frequency of patronage. A "platinum level" frequent flyer member may be identified by their ANI for incoming calls and that call may have a higher value than a call from a "bronze level member." Other contact centers may maintain customer information as to the number of prior purchases from that customer in the past year and establish a value of the caller based on this information. Other applications may associate a demographic characteristic to the caller based on the ANI and derive a relative value from that. Those skilled in the art will recognize that a number of approaches can be defined for assigning a relative value to each call based on the ANI.

However the value of the call may be defined, the contact center may define criteria for determining which abandoned calls will have a callback call initiated. This may include determining whether the caller has sufficient value. Even when this threshold is reached, other criteria may be considered which alters the determination. For example, a contact center may require that callers must have waited in a holding queue for a certain amount of time before abandoning before initiating a callback call. Specifically, a caller who has called, e.g., a customer service number, and waited for 20 minutes before abandoning their call while on hold may be presumed to have an important issue and/or frustrated to the point of abandoning the call. Such callers may be targeted for a call back as opposed to a caller that abandoned the call immediately after being placed in a hold queue. A caller unwilling to wait any time in a hold queue, or in this case, for only few seconds, may not have a pressing issue warranting a callback. That may be indicative of the caller simply changing their mind.

In other embodiments, the incoming caller may be routed to an interactive voice response unit ("IVR"), which can also be considered as a communications handler or a portion of a communications handler. Such components are commonly employed by contact centers, and allow automated interaction with the caller to further qualify the purpose of the call, determine an identity of the caller, etc. An "IVR unit" as used herein refers to the component itself that provides IVR menus. Thus, the concept of providing the function of "IVR menus" is distinct from the component providing the function, which may be an "IVR unit", a dialer, or some other component. Thus, "IVR unit" is distinct from an "IVR menu." In other embodiments, IVR menus may be provided by other components such as dialers, call distributors, or other types of equipment. It is possible for a contact center to employ separate IVR units and other types of call handlers at the same time. It is also possible for a contact center to employ integrated IVR units and dialers.

An IVR menu has a menu structure where announcements, which include prompts for selecting a menu item (a.k.a. a menu selection prompt), are played to the caller. The caller responds by entering a number on their telephone keypad, causing a DTMF tone to be generated, or by speaking a word/phrase which is recognized by appropriate speech recognition technology. The caller's response may be referred to as a "menu selection indication" or such similar terms reflecting the caller's response to an IVR menu prompt. This allows the caller to navigate the IVR menu structure. For example, callers may be requested as to whether they prefer to hear the prompts in English or in Spanish. At certain levels of the menu structure, the caller may be deemed to be sufficiently invested in the call that an abandonment is unexpected and may be mitigated by a callback call. For example, a caller who has reached an IVR menu during the handling of their call, and then selects an option for placing an order, may subsequently abandon the call after waiting. This caller, who ostensibly desired to place an order, but who has abandoned, may warrant a callback call as opposed to one that did not navigate the IVR menu.

In other embodiments, the caller may be placed into a hold queue. This may occur immediately by the contact center upon answering the call, after the caller has heard a prompt, or after the caller has interacted with the IVR menu. However, once the caller is placed in a hold queue, any termination of the call by the caller is considered an abandoned call.

Thus, the contact center operator may use a number of factors in deciding whether a call back call is to be initiated to an abandoned call. Some of the factors include:

1. Purpose of the Incoming Call. The abandoned call may be received at a called telephone number, such as a toll free number, which is recognized by the contact center for receiving certain types of calls. The purpose, whether it be a generalized customer service number or a number more specialized, indicates to the contact center the purpose of the original incoming call. Similarly, an IVR menu may be navigated to ascertain the purpose of the call. This factor may be used to evaluate the value the importance of the call, which may be a factor in determining whether to initiate a callback call.

2. Type of Originating Number. The ANI of the abandoned incoming call can be readily determined as being a wireline or wireless number. A wireless number, i.e., one associated with cellular telephone service, may result in the consideration of certain regulations, namely the Telephone Consumer Protection Act ("TCPA"). The TCPA precludes using an automatic telephone dialing system ("autodialer") to dial a wireless number without the prior express consent of the called party, absent certain exemptions. Various services and databases are readily to industry service providers that indicate whether a number is a wireline or wireless number 3. Time Zone of the Called Party. The callback to the abandoned caller may have to conform to regulations regarding calling windows. These regulations may limit callbacks between 8:00 a.m. and 9:00 p.m., local time of the called party. The local time of the called party can be determined in various ways, including ascertaining of the geographical location of the called party, which in turn allows determination of the applicable time zone. This time zone difference can be used by the contact center to then determine when calls can originate to that number and fall within the allowable calling window of the called party. For example, if the contact center is in the eastern time zone, and the called party is determined to be in the pacific time zone, then there is a difference of three time zones, or hours. Specifically, 8:00 a.m. in the pacific time zone correlates to 11:00 a.m. in the eastern time zone. Thus, the contact center should not normally originate any calls to the called party earlier than 11:00 a.m., local time of the contact center, to callers located in the pacific time zone.

4. Prior Call Attempts to the Abandoned Party. The contact center may have made recent prior outbound call attempts to the party associated with the ANI. (These prior call attempts are not necessarily due to abandoned calls.) The contact center may follow internal or other guidelines that limit the number of call attempts within a certain time period to a given number. Thus, it is possible that a callback to the ANI attributed to an abandoned call may be suppressed because of recent prior call attempts to that number.

5. Pending Callback Calls. It is possible that a calling party may call a number of the contact center multiple times and abandon each call shortly after answer. This could reflect the calling party being placed in a hold queue with a long wait time, hanging up, and reattempting the call after a shortly delay. Further, assuming that the callback does not immediately occur for the first abandoned call, it is possible that a second abandoned call could cause a second pending callback to be scheduled while there is already a first pending callback scheduled. Thus, a check should occur to ensure that there is not another pending callback scheduled to the same ANI.

6. Time Waiting in Hold Queue. The time that a call is in a queue waiting may indicate the level of importance of the call to the caller. The contact center may consider this when determining whether a callback should be scheduled. A caller that enters a queue, encounters a hold message, and quickly terminates the call suggests that the caller did not have a serious inquiry. However, if the caller waited 10 minutes in hold queue, then it may be presumed that the purpose has some level of importance to the caller. The contact center may also prioritize or schedule callbacks based on the hold time in the queue.

7. Prior Call Attempts by the Calling Party. A caller may call in repeatedly, and abandon the call because of long holding times. Thus, a caller that is placed on hold, and abandons after learning of the wait time, and then repeats the process again, may be attempting to speak to an agent, but is unable to wait on hold. This may indicate that the caller is dedicated in attempting to reach an agent.

8. Menu Level. The location in the IVR menu structure when a caller abandons the call may impact whether a callback occurs. Certain menu levels may not warrant initiation of a callback. For example, an initial IVR menu structure may offer a choice of the caller to ascertain a stores operating hours. The caller may select this option, and abandon the call after learning of a store's operating hours. Such an abandonment may suggest the caller obtained the information desired, and a callback would not be appropriate. On the other hand, another menu option may be to speak to a customer service agent about a complaint. If the client selects this option, but then abandons upon reaching a hold message, then this may reflect dissatisfaction by the caller. This type of situation may warrant a callback if the caller abandons the call at this point in the menu structure.

9. Presence of the ANI in a Do Not Call List. Federal regulations may govern whether a telemarketing callback may be originated, based on whether the ANI is indicated in a do-not-call ("DNC") list. There may be various types of DNC lists, including an enterprise specific DNC list, a state-specific DNC list, and a federal DNC list. These lists indicate telephone numbers that should not receive unsolicited telemarketing calls, absent certain exceptions. Each list may have a different scope (e.g., enterprise specific, state specific, or federal level). If the ANI of the incoming call is indicated in any one of these three DNC lists, then this fact may be considered in the decision as to whether a callback should occur. The presence of the ANI on a particular DNC list does not necessarily mean that the call cannot originated to that number, since there are various exemptions which may apply to telemarketing calls. For example, an established business relationship is one such exception. Further, if the call is not a telemarketing call, then the DNC lists may not apply.

10. Existence of an Established Business Relationship. An established business relationship ("EBR") may be an exemption to otherwise suppressing a call to a number that is listed in a DNC list. For example, a telemarketing call to a telephone number indicated in a federal DNC list may be allowed to proceed if an EBR or other form of consent exists between the individual associated with that number and the business.

11. Purpose of the Callback Call. The callback call may be telemarketing or informational in nature. Telemarketing calls include calls which have as their purpose a solicitation to purchase goods or services in some form. Other calls may be purely informational in nature. For example, an enterprise may advertise a toll free number dedicated to informing the caller with certain information. This information could be, e.g., status of a prior order placed, an airline flight status, status of a school closing, etc. The purpose of the call may be considered as to whether the ANI needs to be checked against a do-not-call telemarketing database.

12. Caller Status. The ANI frequently identifies a customer, and can be used to identify a particular customer account. The status of the caller (a.k.a. "customer status") may reflect how the caller is treated with respect to receiving callbacks. A high valued caller who abandons a call to a product ordering telephone number while on hold, may warrant a call back, regardless of the duration of the time they are on hold.

It should be apparent that these factors are not exhaustive and they may be used in combination, or with other factors. For example, the duration a caller is in an IVR menu, along with what particular menu option in the IVR menu structure the caller is in when the caller abandons the call, may be both considered when determining whether to originate a callback. In another situation, the customer status may be considered along with whether the customer has recently placed an order. Those skilled in the art will readily appreciate that a number of combinations are relevant to determining whether a callback should occur, and that in many embodiments, a combination of factors may be involved.

Contact Center Context

FIG. 1 illustrates one embodiment of a contact center architecture 100 that may be used in accordance with the various technologies and concepts disclosed herein. The contact center shown in FIG. 1 may process voice calls and non-voice communications that are inbound-only, outbound-only, or a combination of both (sometimes referred to as a "blended" contact center). For purposes of illustrating concepts associated with callback processing, the illustration will focus on outgoing telephone calls (the callback call), although it should be appreciated that the process presumes there was an abandoned, answered, incoming call. In general, any of the components discussed below as involving handling the outbound callback call can also be involved in handling the original, abandoned, incoming call.

The term "telephone call" as used herein is generally synonymous with a "voice call" unless indicated otherwise. Further, the term "telephone call" may encompass a voice call using any form of currently available technology and directed to any type of telephone device, such as a soft phone 110*a*, a conventional telephone 110*b*, a mobile phone 110*c*, or other device known in the art. This also encompasses various telephony oriented protocols and signaling mechanisms. The term "call" as used herein may encompass an active instance of two-way communication, an attempt to establish two-way communication, or a portion of the two-way communication.

In various embodiments, the communications handler 150 may originate a call. Specifically, the communications handler may be a dialer, such as a predictive dialer, which originates calls and connects an available agent to the call. In various embodiments, the communications handler 150 is typically configured to dial a list comprising call records (and further comprising telephone numbers) to initiate outbound calls. This list, and other related information, may be maintained in the data store 175.

Depending on the embodiment, outbound voice calls may originate to called parties using a variety of different phone types. For instance, a called party may receive a call at a conventional analog telephone 110*b* connected to a public switched telephone network ("PSTN") 115 using an analog plain old telephone service ("POTS") line 116*a*. The calls may be routed by the PSTN 115 and may comprise various types of facilities 116*d* protocols, and technologies, including, but not limited to: T1 trunks, SONET based fiber optic networks, ATM networks, etc. Various types of routers, switches, bridges, gateways, and other types of equipment may be involved in the processing of the calls.

Outbound voice calls may also originate to a mobile phone device 110c, such as a smart phone, tablet, or other mobile device, which wirelessly communicates with a mobile service provider ("MSP") 112. The voice calls may be routed to the PSTN 115 by the communications handler 150 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols, such as SIP or H.323 protocols. For convenience, unless indicated otherwise, the term "trunk" refers to any type of facility 116c, 116d, or 116e providing voice calls to, or from, the contact center, regardless of the type of protocol or technology used. Specifically, a "trunk" is not limited to time-division multiplexing ("TDM") technology, but could refer various VoIP communication channels.

Outbound voice calls may also originate to a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of Internet Protocols ("IP") and facilities may be used to convey voice calls.

In various embodiments, outbound calls from calling parties to the contact center may originate from the communications handler 150, which could be, in one embodiment, a predictive dialer. The communications handler 150 may connect an outgoing call (or more specifically, a call leg) over contact center facilities 165 to a phone device used by an available agent. Depending on the embodiment, the facilities 165 may be any suitable technology for conveying the call, including but not limited to a local area network ("LAN") 170, wide area network ("WAN"), ISDN, or conventional TDM circuits. In addition, the facilities 165 may be the same or different from the facilities used to transport the call to the communications handler 150.

A portion of the call may be referred to as a "call leg" existing between the caller and certain equipment, or between two pieces of equipment. A call may comprise a number of concatenated or joined call legs, which may involve various components at their end-points, as known to those skilled in the art. A call leg may also be unidirectional or bidirectional with respect to the ability to convey speech. Thus, the predictive dialer may originate a call leg to a called party and join that call leg to one established with an agent's telephone, thereby forming the overall call.

In various embodiments, a call leg may be routed over facilities 165 to an agent for speaking with the called party. The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position. The workstation typically has a display, typically provided via a computer monitor. This is used to convey information to the agent about the calls, and where the agent can enter information, such as disposition information. The agent may interact with the communications handler using a mouse or other pointing device in conjunction with their computer display. Disposition information may comprise entering a code or other information indicating the outcome of a call.

In particular embodiments, the voice device 161a-161c used by an agent may be a soft phone device exemplified by a headset 161a connected to the computer 160a. The soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

Agents typically log onto their workstations 160a prior to handling calls. The workstation may also communicate this login information to the communications handler. This allows the contact center (including the communications handler) to know which agents are available for handling calls. Thus, after originating a first outbound call leg for a call, the communications handler will ascertain which of the agent is available to handle the call, and may create a second call leg to the available agent and then join the two call legs, thereby forming the call. In some embodiments where the communications handler is a predictive dialer, the predictive dialer will wait until the first outbound call leg is answered or answered by a live person, and then will immediately join the call leg to the selected agent with the call.

Depending on the embodiment, the interaction between the various components shown may involve using a local area network ("LAN") 170. However, other configurations are possible, such as, but not limited to, using a wide area network, wireless network, router, bridge, direct point-to-point links, etc. Thus, in lieu of facility 165 for conveying audio to the agents, the facilities associated with the LAN 170 may be used.

In some embodiments, the communications handler 150 may be embodied as a modified private automatic branch exchange ("PBX" or "PABX"), which is able to receive incoming calls. Various toll free or other types of numbers may be routed by the appropriate carrier to the communications handler, where the call is processing according to incoming call handling procedures. This may involve answering the call, playing an initial greeting, and placing the caller on hold. Once an agent is available, then the call may be connected to an available agent. In other embodiments, the call may be routed and connected to an IVR unit 135. This allows a more sophisticated interaction, as the IVR may play announcements and process results from the calling party, which may be entered via keypad entry (e.g., via dual tone multiple frequency signals) or via speech responses. The IVR unit 135 may have a sophisticated menu structure that the caller may interact with, which can provide information to the contact center as to the purpose of the call. The IVR unit 135 may place the caller in a waiting queue as well. As noted earlier, the IVR unit may be integrated with other components, such as the communications handler.

Further, in other embodiments, the communications handler 150 may directly interface with voice trunks using facilities 116c, 116d, and 116e to the PSTN 115 and/or Internet providers 123a, 123b for originating and receiving calls. After the calls are originated or received, a transfer operation by the communications handler 150 may connect the call with an agent or place the call in a queue. In various embodiments, the communications handler 150 may make use of one or more algorithms to determine how and when to dial a list of numbers so as to minimize the likelihood of a called party being placed in a queue while maintaining target agent utilization.

An administrator computer 157 may be used by the administrator to perform the configuration and administration of the communications handler, the LAN, and other components in the contact center. The administrator may have access to various data structures (as discussed herein) and can configure the communications handler and the IVR unit and the parameters of the process originating the callback call.

Although a number of the above components may be referred to as a "component," each may be also referred to in the art as a "computing device," "processing system", "unit", "server", or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 150 or other component may be combined into a single hardware platform executing one or more software modules. In addition, the contact center architecture 100 may be provided as a hosted solution, where the call processing functionality is provided as a communication service (a so-called "communication-as-a-service" or "CaaS") to a contact center operator. Thus, there is no requirement that the servers identified above actually be located or controlled by a contact center operator.

In addition, depending on the embodiment, the agent positions may be co-located in a single physical contact center or in multiple physical contact centers. The agents may be remotely located from the other components of the contact center, and may also be remotely located from each other, in an arrangement sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Those skilled in art will recognize FIG. 1 represents one possible configuration of a contact center architecture 100, and that variations are possible with respect to the protocols, facilities, components, technologies, and equipment used. For example, various algorithms and queuing arrangements may be defined to efficiently process and/or place calls.

Overview of E-ACR Processing

Figure 2:
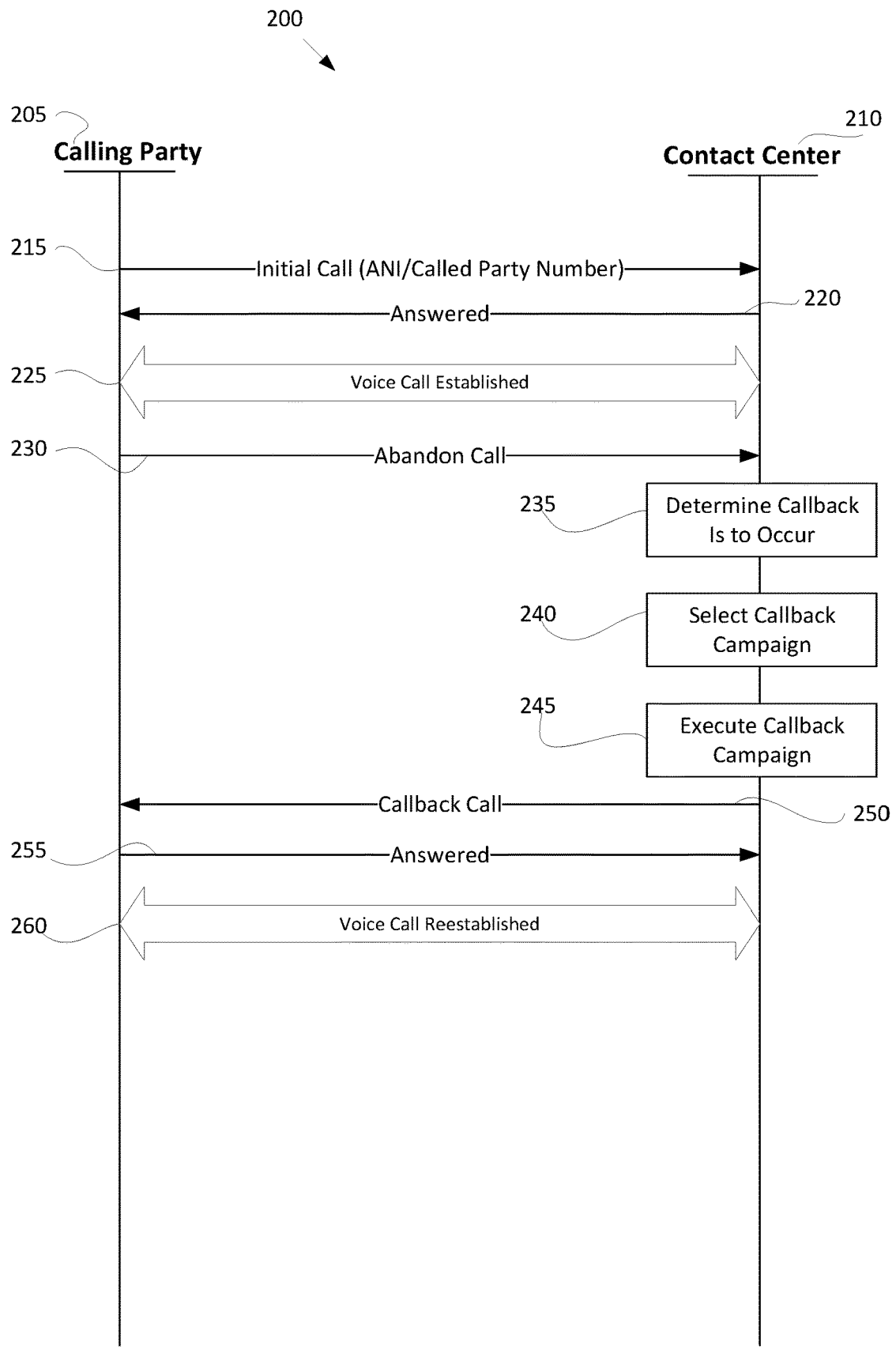
FIG. 2 illustrates one embodiment of a messaging flow between a calling party and a contact center for illustrating the concepts and technologies disclosed herein.

FIG. 2 provides an overview at a high level of one embodiment of a messaging flow 200 between a calling party 205 and a contact center 210 for processing an enhanced abandoned call recovery ("E-ACR") callback call. The process begins when the calling party calls the contact center in operation 215. This may be directed to a toll free number or a non-toll free number and is answered by the communications handler 150 or the IVR unit 135 of FIG. 1. In most cases the incoming call will indicate the ANI of the calling party. This is, this is the ANI of the incoming call that will be abandoned subsequently. The called party number (or dialed number) of the incoming call may be dedicated for a particular purpose, such as for customer service, ordering, returns, etc. The call is then answered in operation 220. Any of the well-known telephony signaling protocols may be used to establish the voice call. A voice connection is then established in operation 225. The calling party may then be presented with a "hold message" by the contact center indicating that an agent is presently unavailable. Or, the calling party may be interacting with an IVR menu provided by an IVR unit, which are also well-known in the industry. The IVR menu can play announcement and collect a response, typically either in the form of a dual tone multiple frequency ("DTMF") signal or a voice response. The menu of options is then navigated by the calling party as they deem appropriate. During this process, the IVR unit may be retrieving caller information from various information systems based on the ANI communication in the initial call 215. This information may be used by the IVR when formulating a prompt to the calling party.

At some point during the call, the calling party abandons the incoming call in operation 230. The reason they may abandon may vary. The calling party may have grown impatient waiting in a hold queue or may have been frustrated navigating the IVR menu. For example, some IVR menus may require the caller to enter information they may not readily have. The caller may not know how to respond and may hang-up during the call. Because the contact center cannot is not informed why the calling party abandoned the call, the contact center may use other information to aid in deciding whether the callback should occur. Thus, it is possible that the E-ACR process may be invoked when the calling party accidentally abandoned the call, dialed a wrong number, changed their mind, or realized they did not need to originate the call in the first place. However, the contact center may determine from other information that the caller likely had a need to communicate, but was not willing to wait on hold.

For purposes of illustration, two common scenarios are considered that may result in the caller abandoning the call. The first scenario involves the calling party being placed in a "hold queue" or a "waiting state" or simply "on hold." This may occur when the call is answered by an ACD and placed in the hold queue. Another common scenario is when the caller is interacting with an IVR menu. Based on traversing a menu structure, the calling party may be told e.g., to wait for an agent or may be prompted for information they do not readily have or know. A caller in the IVR menu may be further qualified as to their call, and then placed in a particular hold queue for a select group of agents having a particular skill set.

It is also possible that a calling party dialing the telephone number of the contact center may be placed into a hold queue, and no E-ACR processing is defined for that queue if they abandon the call. On the other hand, the calling party may dial another telephone number of the contact center that does allow E-ACR processing to occur. These different conditions may be referred to as where E-ACR processing is assigned, e.g., which queues have E-ACR associated with them. For reference purposes, these queues or IVR menu locations are referred to herein as (or as having) an "E-ACR assignment point", "assignment point", or "E-ACR assignment." The indication of an E-ACR assignment point indicates that the E-ACR callback processing is activated. If the caller abandons the call where E-ACR processing is assigned or activated, then the E-ACR processing module may be triggered when the caller abandons. Similarly, if the caller abandons the call where E-ACR is not assigned (or deactivated), then no E-ACR callback occurs. This determination is illustrated in operation 235.

The definition of an E-ACR assignment point in operation 235 does not necessarily mean that a callback will occur, as will be seen. Rather, the processing in operation 235 represents various E-ACR related tests that are carried out to further determine whether an E-ACR callback occurs. If there was not any E-ACR assignment point defined, then these tests would not be carried out. For various reasons, it may not be possible to initiate a callback for this particular call even though an assignment point exists. Thus, it is possible that different callers reaching the same E-ACR assignment point may have different outcomes with respect to actually receiving an E-ACR callback call. One may receive a callback whereas the other may not. Further details on the processing occurring in operation 235 are discussed below.

Assuming that the determination is that a callback is to occur in operation 235, the next operation involves selecting an appropriate callback campaign to use when initiating the callback in operation 240. An E-ACR assignment point may allow a number of callback campaigns to be selected from when making the callback call. A "campaign" is a set of calls that share a common aspect, with respect to their purpose and handling by the contact center. There may be outbound campaigns as well as inbound campaigns. The campaign may define various parameters used by the contact center equipment in handling the call. In some cases, the campaign may also define a skill set required by agents to handle the call. In other cases, the campaign may point to further information that indicates a particular skill set. In the case of the abandoned call, that call was directed to a called number that would be associated with a particular inbound campaign. In the case of the callback call, it would be considered as an outbound call, and it will be associated with a particular outbound campaign. Since the callback call is a special type of outbound call, the campaign is referred to as a "callback campaign" to distinguish it from other outbound campaigns. However, that callback campaign will need to identify appropriate agents associated with the original inbound campaign.

A callback campaign (as to other outbound campaigns) needs to define various parameters in originating the outbound call. For example, a contact center may have a number of agents assigned to a particular inbound campaign. There may be a group handling customer service, another group handling product orders, and another group handling shipping status information. If a calling party calls a telephone number dedicated for handling e.g., product orders and abandons the call while waiting in a queue, then a callback to the calling party should be assigned to an agent in the group handling product orders. It would serve little purpose to connect that abandoned call to an agent handling e.g., shipping status or product returns, as the agent would not have the skills or ability to service the calling party.

The callback campaign may define which set of agents are handling calls for that campaign, e.g., which agents have the skills to handle the callback calls. The callback campaign may indicate other information that is necessary when handling an outbound call. Each outbound call from the contact center has to indicate an ANI value, which is the originating number used by the contact center. Further, the contact center may desire to populate calling name information on the outbound call. These values are typically indicated by, or associated with, the (outbound) campaign parameters. Thus, different callback calls may be associated with different callback campaigns.

An example may illustrate this very clearly. A contact center may service two clients, and receive incoming customer service calls on two separate numbers for two banks—Bank A and Bank B. Assume Bank A is associated with number 800-555-1000 and Bank B is associated with number 800-444-9999. If a caller abandons a call while waiting in queue for Bank A, and a callback call is initiated, that callback call will indicate an ANI of 800-555-1000 and the calling name of "Bank A." Similarly, a caller receiving a callback after abandoning a waiting queue for Bank B may receive a callback call with an ANI of 800-444-999 and the calling name of Bank B. Thus, each calling party receives a call appearing as the call originated from the bank they just called. Each callback may be associated with an a different callback campaign, which is associated with the appropriate parameters to be used. Further, each outbound callback campaign may define separate groups of agents, each of which are familiar with the respective bank's services. For example, if the original call was to a mortgage group at a bank, then the callback call will be handled by agents able to handle mortgage related issues for that bank (as opposed to e.g., auto loans).

Those skilled in the art will recognize that the particular parameters indicated by an outbound callback campaign may vary. In this embodiment, a campaign defines which communication facilities are used, which calling number/name is used, and a group of agents allocated to the callback call. However, in other embodiments further granularity may be desired. For example, although the campaign may indicate a single toll free number for customer service, an IVR unit may answer the call and further qualify the purpose of the call. This may impact which group of agents are capable of being allocated to handle the callback call. Specifically, subgroups of agents may be trained to handle orders of an item, but some agents may have certain skills which are required based on the IVR interaction, such as a language skill. A group of agents may all have English speaking ability, but only a subset may be able to speak Spanish, or some other language. Further mechanisms for indicating a particular skill level will be discussed below. It can be readily imagined that further combinations are available. For example, there may be one group of agents that can speak Spanish and are capable of servicing auto loans for a bank, and another group of agent that can speak English and are capable of servicing mortgages.

Returning to FIG. 2, after the callback campaign is selected in operation 240, the next operation involves executing that callback campaign in operation 245. Specifically, the process involved in originating the callback call is executed, which leads to originating the callback call itself in operation 250. In this embodiment, the callback call 250 is shown as having been answered in operation 255, leading to the establishment of a voice call in operation 260. In other embodiments, the callback call may not have been answered.

As shown in FIG. 2, an E-ACR callback involves a call directed to the original ANI of the abandoned (incoming) call. Then, the contact center originates the callback call using its ANI, which is directed to the ANI of the original calling party. That is, the contact center uses the ANI of the calling party as the called party number in the callback call 250. To avoid confusion, the ANI of the abandoned call, i.e., the ANI of the calling party is typically referred to as the "called party ANI" or simply the ANI of the incoming call. However, when the callback call is originated, the calling number of that call will be referred to as the "ANI of the callback call", "callback ANI", or "contact center's ANI" to avoid confusion. In other words, it is important to understand the context of which call is being referred to when referring to the "ANI" or "called party number", since the same values may represent different parameters based on the particular call context.

The processes shown in FIG. 2, namely determining whether a callback is to occur in operation 235, the selection of the callback campaign in operation 240, and the execution of the callback campaign in operation 245 are shown as logically distinct processes. In various embodiments, these processes may be implemented as an integrated process, just two processes, or more than three processes. In some embodiments, the illustration as different processes facilitates reusing portions of existing contact center component/capabilities. For example, many outbound contact centers define outbound campaigns, and being able to define an outbound campaign as a callback campaign may allow reuse of existing procedures/capabilities. It should be recognized that there are a variety of ways that the concepts can be implemented in terms of processes and modules, and the examples provided herein are not intended to limit or preclude alternative embodiments.

Contact Center Components Involved in an E-ACR Callback

Figure 3:
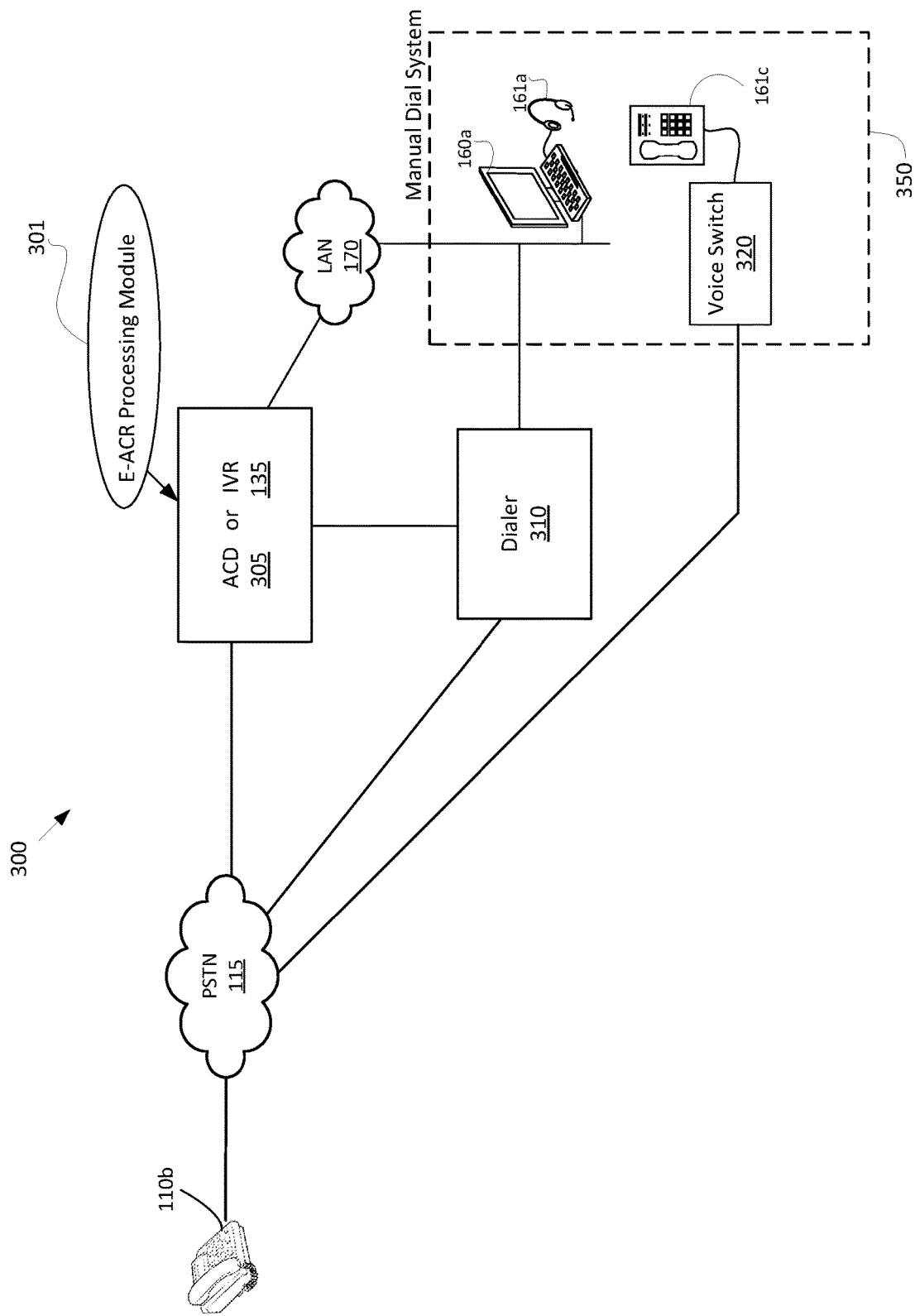
FIG. 3 illustrates another embodiment of a contact center architecture showing additional details with respect to practicing the concepts and technologies disclosed herein.

The messaging flow 200 of FIG. 2 illustrates at a high level some of the messaging between the calling party and the contact center. Turning now to FIG. 3, this system 300 illustrates one embodiment of how the actions may occur within the contact center. This calling party, represented by the telephone 110b, initiates a call via the PSTN 115 to the contact center, where the call is routed and answered. In this embodiment, the call may be answered by an automatic call distributor ("ACD") 305 or an IVR unit 135. These may be embodiments of the aforementioned communications handler 150 of FIG. 1. That component may incorporate an E-ACR processing module 301, which determines whether an abandoned call potentially receives a callback call.

If the caller does abandon their call, and the E-ACR processing module 301 determines a callback call is warranted, then this embodiment illustrates two alternative ways as to how the callback can be accomplished. In the first embodiment, the E-ACR processing module places a request for the call back call into a callback queue in the dialer 310. The dialer may have a mechanism for receiving external requests to initiate a call. In this embodiment, the E-ACR processing module selects an appropriate outbound calling campaign, e.g., which in this case would be a callback campaign, recognized by the dialer 310. The dialer will originate the call via the PSTN back to the calling party, and connect a call leg to the agent's voice device 161a. Simultaneously, or almost simultaneously, the dialer will provide information for display on the agent's computer 160a, informing them that the call the agent is being connected to is an ACR callback call. The information indicating the call is an ACR callback call could be visual or aural information provided to the agent. In this embodiment, the dialer would typically use the computer 160a and telephone device 161a that the agent normally uses for other dialed calls.

The other way the E-ACR processing module may cause a call back to occur is to send the information to a manual dial system 350. In this case, the E-ACR sends the information of the telephone number to be dialed (and any other related information) for display on the agent's computer 160a. The E-ACR does not direct another processing system to originate the call, but merely informs the agent that a call should be manually dialed by the agent. In this embodiment, the agent then manually dials the number displayed on the computer screen using a telephone device. In this example, the telephone device is a "hard phone" 161c. In other words, the telephone device is a separate, physical device, as opposed to a "soft phone" 161a which is a software program executing in a computer emulating a telephone. The agent manually enters the telephone number using the telephone device 161c, which causes a call to be originated using a voice switch 320. The voice switch 320 may be a specialized voice switching device, a generic voice switching device such as a PBX, PABX, etc. The call is then established to the PSTN 115 and to the original calling party's phone 110b.

The use of the manual dial system 350 may be appropriate in light of various federal regulations prohibiting using an automatic telephone dialing system ("ATDS") to originate calls to a wireless number if there is no prior express consent from the called party. A calling party who calls a contact center from a mobile phone, and who then abandons the call, may not be viewed as having provided the requisite express consent to be called back on that wireless number. If the contact center does not have such consent, then the contact center may originate the callback using the manual dial system so as to avoid using the dialer 310, which may be construed as an ATDS. Further information on one embodiment of a manual dialing system may be found in e.g., U.S. Pat. Nos. 9,420,102 and 9,521,256, the contents of each of which are incorporated by reference for all that they teach.

In other embodiments, the IVR unit, or ACD, could itself incorporate the callback function and originate the callback call. For example, the IVR unit could originate the outbound callback in this limited circumstance, and transfer the call leg into an ACD, which then is routed to an available agent. Those skilled in the art will readily appreciate that a number of arrangements are possible for originating and routing the callback call in a contact center to an agent.

Process Flow of an E-ACR Callback

Figure 4:
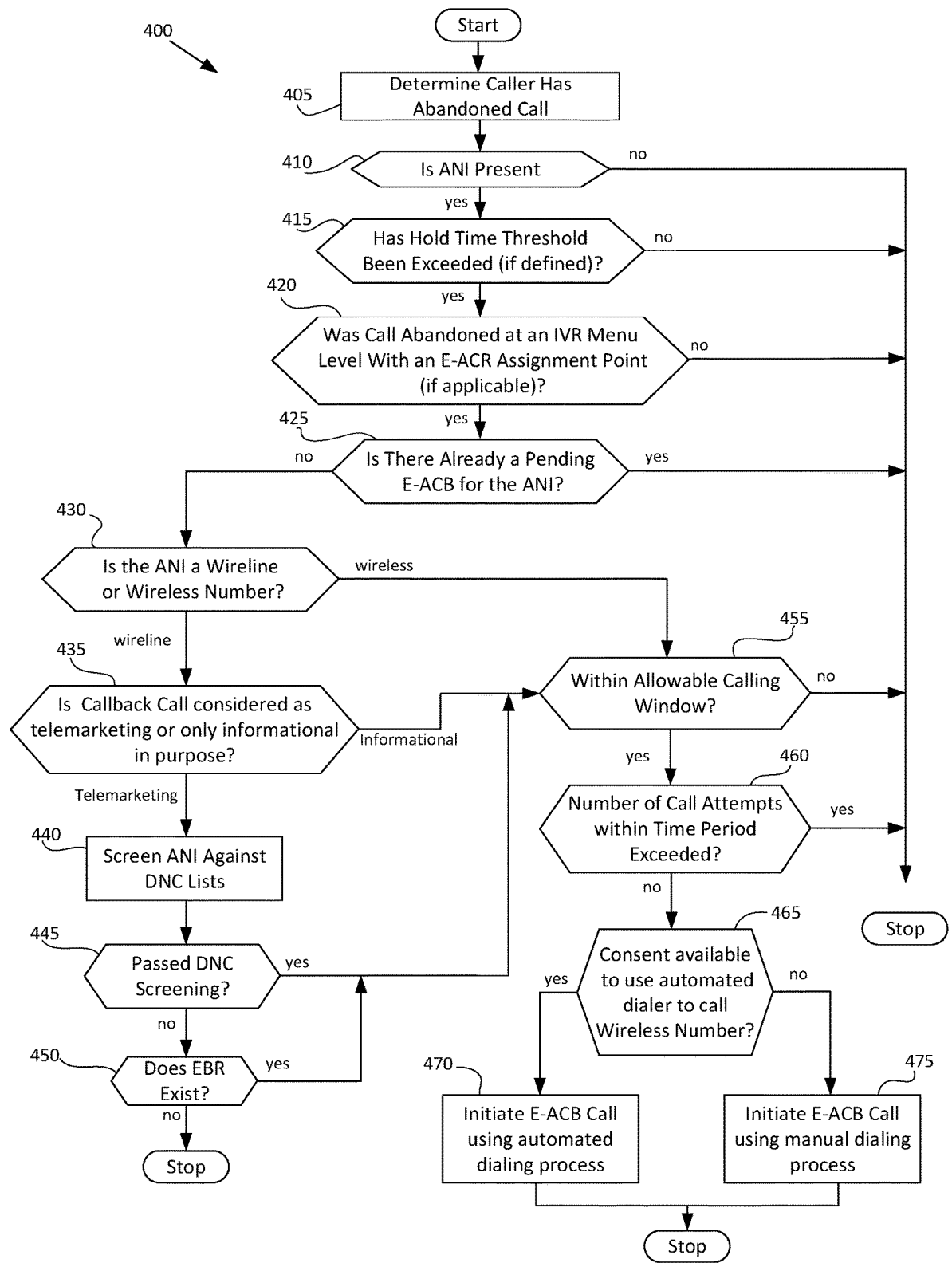
FIG. 4 illustrates one embodiment of a process flow for initiating an abandoned call recovery callback.

The process flow of an E-ACR callback call has a number of variations, as will be seen. It is not necessary to illustrate or discuss each and every combination in order to convey to one skilled in the art the various options and variations. Consequently, the process flow 400 of FIG. 4 is sufficient to illustrate the concept and technologies associated with an E-ACR, and some of the major variations that are possible are identified in the description provided below.

The process flow 400 illustrated begins with determining that the caller has abandoned the call in operation 405. Determining the caller has abandoned the call is readily ascertainable, since all telephony signaling protocols incorporate some mechanism to inform the called party that the call is terminated. However, the contact center may not readily distinguish between a call that is normally terminated versus a call that is abandoned. An abandoned call could be defined as a call that is terminated by the calling party prior without accomplishing the purpose of the call. For example, the calling party may have been placed in a hold queue and is no longer willing to wait to be connected to an available agent. Thus, the contact center may not be able to readily ascertain whether the call was abandoned or not. Generally speaking, however, if the calling party is waiting in a queue for an agent, and the call is terminated by the calling party and if other criteria is met, then the contact center may presume that the call was abandoned.

While the termination of a call can be readily determined by the contact center, not all incoming calls will necessarily have calling number information or an ANI present. The information may not be provided, the number may be blocked, or some other reason may preclude the ANI from being passed for this call. If the ANI is not present, then it is usually not possible to then originate a callback to the calling party. Hence, the process then terminates. There are some exceptions to the general situation that a callback cannot occur. It is possible that the user could have interacted with an IVR menu and entered their telephone number or other information (such as a customer number or account number) that would allow identification of their telephone number. Thus, in these cases, even if the ANI was not provided with the original call, the telephone number of the calling party could be determined in other ways. In such cases, the lack of an ANI would not necessarily terminate the process by precluding a callback call.

Assuming that the ANI is present or ascertainable in operation 410, the next operation is to determine whether the hold time threshold timer has been exceeded in operation 415. This step is optional, and it reflects how long the caller has been in a hold queue. This timer may be used when the call is answered and the calling party is asked to wait for the next available agent. A minimum amount of time may be required for the call to be eligible for an E-ACR callback. Other embodiments may not necessarily use a hold time threshold timer.

The hold time threshold can be implemented by a timer associated with the call that is started when the call is placed in the hold queue. The thinking is that a caller who has abandoned a call shortly after being placed in a hold queue may not warrant a callback. On the other hand, a caller who has waited a longer time (e.g., 10 minutes or more) before abandoning their call was evidently determined (to some extent) to speak to an agent. This type of caller may be eligible for receiving a callback call. Whether there is a hold time timer implemented or not (and its value) may vary in different embodiments.

Another optional test is shown in operation 420. This test determines if the caller abandoned the call in an IVR menu that had an E-ACR assignment point. Recall that the assignment point is an indication whether an abandoned call occurring at a particular menu option should receive E-ACR processing. If that point in the IVR menu does not have an E-ACR assignment point defined and the call is abandoned at that point, then no E-ACR callback will occur. If there is an E-ACR assignment defined, then an E-ACR callback may occur, but not necessarily. As shown below, there are additional tests that may be required before the E-ACR callback actually occurs.

The test shown in operation 420 is optional, and it may be variously combined with the hold time test in 415. That is, it is possible that after a first call has entered an IVR menu and navigated to a certain menu option and placed in a hold queue, then the first call will receive E-ACR processing after it is abandoned. However, a second call entering the IVR menu, navigating to a different menu option, and being place on hold, will not receive E-ACR processing treatment when the second call is abandoned.

Assuming that the tests shown in operations 410, 415, and 420 reflect that the call is eligible to receive E-ACR processing when abandoned, another test is shown in operation 425 to determine if there already is a pending E-ACR callback process involving that ANI. This is to avoid the possibility of making two E-ACR callbacks to the same number in a short period of time. For example, a calling party may call a contact center and be placed on hold. The initial message may say that the waiting time is 20 minutes. The calling party waits a short time (enough to exceed the hold threshold timer, if there is one) and then decides to abandon the call. This would cause the E-ACR callback process to be initiated. However, there may be a short delay (on the order of several minutes or so) before the E-ACR is actually initiated. In the meantime, the caller may call back, and abandon their call again. This could potentially cause a second E-ACR callback to be queued for the same caller. To avoid the calling party receiving two callback calls, a check is made to see if a callback is already pending to that same ANI. If there is, then the process terminates. If there is not, then the process continues to operation 430.

A test may then be made in operation 430 to determine whether the ANI is a wireless or wireline number. This may involve initiating a query to a database, which maintains a list of wireless numbers. Such databases are well known in the contact center industry, as they are used to identify wireless numbers that should be dialed using a manual dialing system, as opposed to an ATDS in certain conditions. Assuming the number is a wireline number, the process proceeds to ascertaining the nature of the callback call in operation 435.

The nature of the callback call may be classified as either a telemarketing call or an informational call. An informational call can be defined as not being a telemarketing call. These are intended to be mutually exclusive classifications. Various federal regulations apply to telemarketing calls, which involve in some form a solicitation for buying goods or services. If there is no such solicitation, then the call is presumed to be merely providing information to the called party. A call that is mixed, e.g., includes both solicitation and informational aspects is considered to be a telemarketing call. The determination of whether a call is informational may depend on various factors, and the particular criterion used in making this determination does not alter the concepts and technologies disclosed herein.

If the call is considered as involving telemarketing, then the callback to the ANI may involve the contact center screening that ANI against various do-not-call ("DNC") lists. A contact center operator may check the ANI against an internal DNC list, a state DNC list, and/or a federal DNC list. The DNC lists are designed to allow individuals to indicate that they do not want to receive an unsolicited telemarketing call.

The screening of the ANI against the various DNC lists in operation 440 is then followed by a test in operation 445 as to whether the number was in any DNC list. If the number is on a list, then a determination is made whether there is any exemption for that calling party in operation 450. One such exemption is whether an existing business relationship ("EBR") is maintained for that calling party. These exemptions may be defined for individuals that have completed a transaction with the seller or have initiated an inquiry to that seller. Those skilled in the art of telemarketing regulations will be familiar with the DNC prohibition and its exemptions. There are also various state regulations that may designate certain times, dates, or holidays during which telemarketing calls may not be originated. If there is no exemption or prohibition, then the process may stop. That is, the callback call will not be originated.

Some may consider that the original call that was abandoned to be an inquiry, which by itself may be an exemption. While this may have some appeal from a logic perspective, the facts of each call may dictate a different conclusion. Further, reasonable minds could differ as to whether the abandoned call constituted an inquiry and thus constitutes an EBR. The process represented by operations 430-450 illustrate that a callback to a wireline number that is for telemarketing purposes, may involve checking various DNC lists to determine whether to suppress the callback to that number. If the call is informational, is not on a DNC list, or an exemption exists (however that may be determined), then the process may proceed to operation 455.

Operation 455 proceeds with the assumption that the callback is not blocked for telemarketing reasons. However, additional tests may be required. The test in operation 455 determines whether the callback would be within an allowable calling window for the called party. Many federal regulations limit the calling window from 8:00 a.m. to 9:00 p.m., based on the local time of the called party. A variety of methods can be used to determine the calling window, including mapping the area code of the telephone number of the called party to a time zone, determining a postal address of the called party, or a combination based on the two. Even if there are not applicable federal regulations, many contact center operators follow this calling window guideline, or some other internal calling window guideline. There may be other state regulations that may limit the calling window of the callback call, based on various factors.

The determination of the allowable calling window involves determining the local time for the calling party, which typically involves determining the time zone/location of the area code of the ANI. In other embodiments, the local time calculation may be supplemented by using address information maintained by the contact center operator, which can be determined using the ANI. For example, a customer's account may be located using the ANI and the customer's address may be indicated in that account. It may be presumed that the calling party is located in the time zone corresponding to their address, since the ANI may be a wireless number and the area code may not be representative of their current location and corresponding local time. Those skilled in the art will recognize that a variety of approaches can be used to ascertain whether a call to a number is within an allowable calling window. If the calling window has "closed" in operation 455, then the process terminates and no callback call occurs. This determination may take into account any delay in originating the callback call. For example, in some embodiments, the callback call may occur after a set time after the call was abandoned, e.g., 2 minutes. If the call abandoned at e.g., 6:59 p.m. relative to the contact center and originated in a different time zone, then a callback call in 2 minutes, e.g., at 7:01 p.m. may fall outside the calling window. In other embodiments, the callback may be scheduled for the next opportunity when the calling window is "open."

Assuming that the callback call would fall within the calling window in operation 455, then another test is made to see if the callback would exceed a number of prior call attempts to the same number within a certain time period. This test could detect, e.g., the possibility of a prior E-ACR call that just occurred, and preclude multiple E-ACR callback calls (or other types of calls) to the same number. In another embodiment, the contact center may have originated prior attempts to that number prior to the abandoned call during a defined time period (e.g., that same day). Originating a callback to that number may be associated with potential risk in regard to various regulations in regard to a number of call attempts to that number. Hence, the contact center operator may define a limit of the number of allowable attempts. If the limit is exceeded, then the process stops. If the limit is not exceeded, then the process continues.

The next test involves whether the number is a wireline or wireless number in operation 465 and whether consent was obtained to call that number using an ATDS. Certain regulations may preclude using an ATDS to dial a wireless number if no prior express consent was obtained from the called party to dial that number. Those familiar with the TCPA and related rules will readily appreciate the need for this test. If the number is a wireless number, and there is no prior express consent obtained to dial that number, then the process proceeds to initiating the E-ACR call using a manual dialing process in operation 475. In various embodiments, prior express consent may take on the form of prior express written consent, which indicates a higher level of consent. Originating a call using a manual dialing system disclosed in conjunction with FIG. 3 may be that as described in aforementioned patents, e.g., U.S. Pat. Nos. 9,420,102 and 9,521,256.

If the process involves a wireline number, or a wireless number for which consent exists, then an automated dialing process may be used to originate the E-ACB call in operation 470. The automated dialing process may involve an ATDS, of which a predictive dialer is frequently considered to be an example thereof Reviewing the process 400 at a high level, there are a number of tests (operations 405-425) which must be first met to determine whether the E-ACR should even be considered. The tests shown in FIG. 4 are not intended to be exhaustive or all mandatory. As noted earlier, there are variations not shown, which involve fewer or additional tests.

The process 400 also involve a number of additional tests that determine whether a potential E-ACR callback can occur, taking into account various regulatory requirements. These are reflected in operations 430-475. The process flow may be different based on how these regulatory requirements are interpreted for a callback call. However, generally speaking, an abandoned call typically does not automatically result in a callback call without first going through these various enhanced compliance checks and other determinations as to whether a callback is even warranted.

To illustrate an example of where a callback may or may not be warranted, assume a caller interacts with an IVR menu to make a payment, and abandons the call prior to final authorization of a payment. A callback may be warranted in order to complete the payment. On the other hand, a caller who has completed final authorization of payment may abandon the call prior to completion of the final announcement indicating "Thank you, your payment has been received." The caller may have determined that the purpose of the call was accomplished, and that they could terminate their call. Treating this as an abandoned call and initiating a callback may not serve any useful purpose. Further, if the automated system handled this call early in the morning (e.g., 1:00 a.m.) local time of the caller, a callback to the caller could be interpreted as harassment. Further, if the caller had used a mobile phone to make the payment, making a callback using equipment considered to be an ATDS could subject the contact center operator to liability.

The process shown in FIG. 4 is only one possible embodiment. Other embodiments may incorporate additional tests. Further, not all tests shown may be required in every embodiment. In addition, the tests shown may be implemented in different ways. In some embodiments, all the tests shown could be executed in the E-ACR module. In other embodiments, a subset of the tests may be performed in the E-ACR module and the remaining tests may be performed by the outbound callback campaign performed, e.g., in another module in a dialer or by some other component. This latter approach allows reuse of some of the existing processing capabilities which may be present in certain components in the contact center. Further, the relative order of many of these functions may be altered, and still embody the concepts and technologies disclosed herein.

Figure 5:
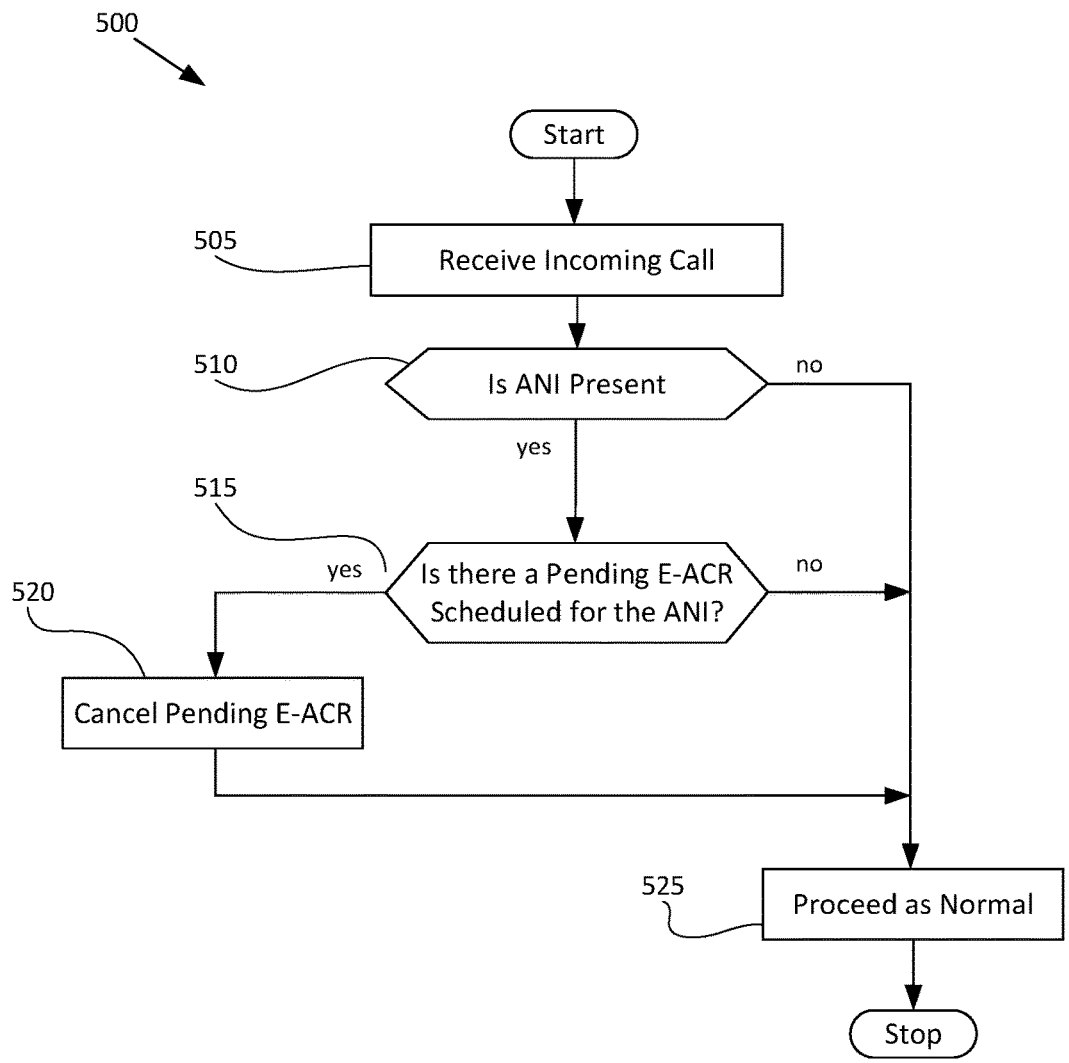
FIG. 5 illustrates one embodiment of a process flow for processing an incoming call with respect to practicing the concepts and technologies disclosed herein

Turning to FIG. 5, an embodiment of a process flow is illustrated addressing how to suppress the potential of originating multiple E-ACR calls to the same ANI. This situation could arise if the calling party calls the contact center, abandons the call, and repeats the process. The ACD or IVR unit could receive an incoming call in operation 505 and first determine if an ANI is present (or is otherwise ascertainable) in operation 510. If not, then the process continues to proceed as normal in operation 525. In most cases, an ANI will be present, and the process continues to determine whether there is a pending E-ACR process associated with that same ANI in operation 515. If there is, then the process cancels that pending E-ACR process, and continues to proceed as normal in operation 525. If there is no pending E-ACR process, then the process also proceeds as normal. This process prevents the first E-ACR process from originating the callback call if the calling party abandons the second call again. If so, then a second E-ACR process could be initiated. However, because the calling party has initiated a second call, there is no need to complete the initial E-ACR callback.

Provisioning E-ACR

Provisioning the E-ACR indicates when the process applies to an abandoned call handled by the contact center and if so, whether the conditions permit or otherwise allow the E-ACR to be originated. Thus, provisioning defines an E-ACR assignment point. As indicated earlier, there are a number of tests that may be involved to ascertain whether the E-ACR callback should be initiated. In various embodiments, the provisioning process may vary, and different types of user interfaces, procedures, or templates may be involved.

In the examples provided below, provisioning the E-ACR can be divided into two provisioning aspects. First, the E-ACR assignment points have to be defined. These indicate when an abandoned call will be processed using the E-ACR processing to determine whether a callback call should be originated. Next, a callback campaign must be defined, and linked to the assignment point. In some embodiments, the overall E-ACR processing may be implemented using two modules. One module is executed at the E-ACR assignment point, and then the other module is executed by the callback campaign. Thus, the various tests discussed previously in FIG. 3 may be divided into two modules, which may be convenient in some implementations. Other implementations may opt to define a single module that performs all of the E-ACR processing steps. Whether one, two, or more modules are involved is simply an implementation choice.

Identifying E-ACR Assignment Points—Campaign Level

There are various situations when a caller may abandon a call. The caller may be waiting in a hold queue listening to music and then decide to abandon the call. The caller may be interacting with an IVR menu and likewise decide to abandon the call. The caller may have been connected to an agent, and may be put on hold or may be transferred to another agent, and then decide to abandon the call at that time. A contact center may decide to limit which of these situations when an E-ACR callback may be initiated. The example disclosed herein provides two examples, but is not intended to limit the scope of where E-ACR assignment points can be defined.

The first example involves an ACD. A typical example is a caller calling a published number, such as a toll free number for customer service, and encounters an initial greeting and is then placed in a queue. In many cases, the caller is not informed of the average wait time. In other instances, the caller may be informed of the expected wait time and find that it is unacceptable. In various embodiments, the caller is on hold and hears a recorded marketing message or music, which may have an uncanny ability to become more annoying as the caller waits.

In this application, the E-ACR assignment point may be associated with an inbound campaign, which is associated with the dialed number. Thus, an E-ACR assignment point could be assigned to one toll free number, but not another. While it is possible to define an E-ACR assignment point to each and every hold queue, this would not provide a level of discrimination that may be desired. Typically, only certain campaigns may have a callback enabled. Alternatively, the E-ACR could be assigned to certain calls on some other basis, such as a trunk group, required skill set, for example.

Figure 6:
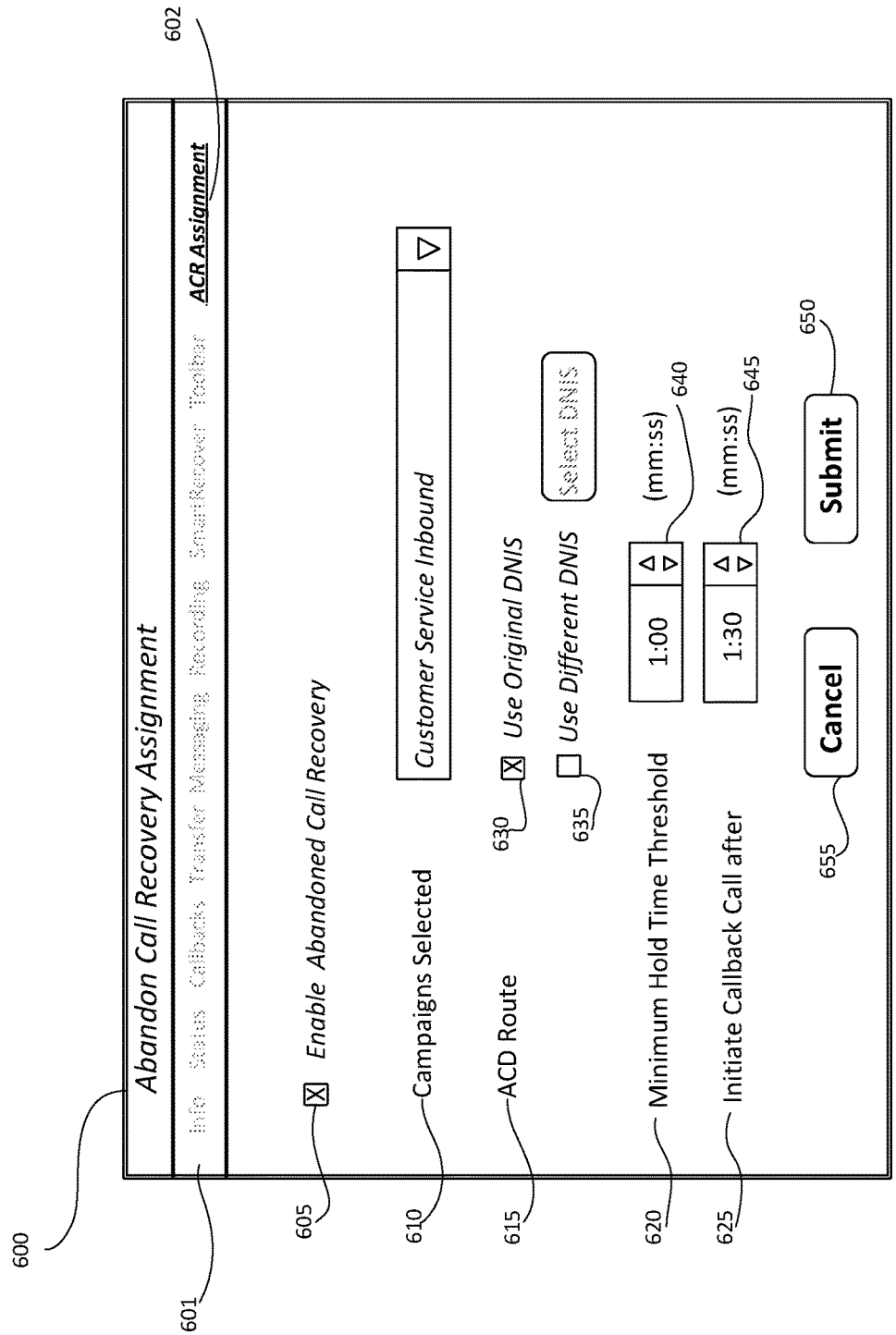
FIG. 6 illustrates one embodiment of graphical user interface for defining an E-ACR assignment point in a campaign.

Assignment to an inbound campaign can be accomplished by defining an appropriate graphical user interface ("GUI") that is completed when the inbound campaign is defined. One such GUI is shown in FIG. 6. Turning to FIG. 6, the screen image 600 is completed by an administrator prior to the contact center receiving incoming calls on the ACD for that campaign. There may be a number of screen image GUIs that the administrator may interact with for various purposes for a campaign, as indicated by the function line 601 that allows the administrator to define various parameters. One of the options is to select the "ACR Assignment" option 602, which results in presenting the current screen image 600.

The screen image 600 includes a checkbox 605 for indicating that the E-ACR assignment is to be enabled with the campaign. The use of the short term "ACR Assignment" or "Abandoned Call Recovery" in the figure as opposed to using "Enhanced Abandoned Call Recovery" or "E-ACR" is merely a design choice. Other labels or terms could be used.

The next line 610 indicates the one or more campaigns that are to be enabled with the feature. The next line 615 allows indicating the default DNIS 630 (which would be a default dialed number, which may be in the form of a toll-free or "800" number dialed to reach the contact center) or another DNIS value 635. The indication of a DNIS reflects a routing scheme for how the call is connected to an agent or subgroup of agents in the contact center. For example, if the DNIS were the original DNIS of the campaign, e.g., the main toll free number for customer service, then that the calling party would have originally dialed, then that DNIS would define which group of agents would be eligible to handle that incoming call. Once a callback call is made, a call leg is directed to the ACD and in this example, that call leg is treated as if it were an incoming call to that DNIS. Thus, the call leg of the callback call would be routed to the same group of agents that would normally handle an incoming call to that customer service DNIS.

In some cases it may be desirable to specify a different DNIS. For example, a different DNIS may be associated with the campaign that routes the call to a different set of agents—such as the Spanish speaking customer service agents. For example, when the caller abandons the original call, this may be after caller has interacted with an IVR menu asking whether the caller would prefer to wait for an English or Spanish speaking agent. The agent could have selected Spanish speaking agents, and then abandoned the call. If so, then the callback call should involve a Spanish speaking agent.

In another embodiment, the callback call could be directed to agents allocated to handle a high value caller. For example, upon receiving the original call, the calling party's ANI would be examined and determined that the caller is a "gold level" customer. When a callback is initiated to that caller, the DNIS could specify for that callback, the callback call should be routed to agents specializing in handling "gold level" customers. Or, if the caller previously was identified as a gold-level customer who had selected a Spanish speaking agent, then the DNIS on the callback call could be specified so that the call is routed to Spanish speaking agents specializing in handling "gold level" customers.

In this embodiment, there are two parameters set by the administrator. The first value is the minimum hold time threshold 620, which in this illustration is set to one minute 640. This reflects the minimum hold time that a caller has to wait in a queue before abandoning the call in order for the E-ACR process to be applied. A caller that waits less than a minute may be presumed to not have been that interested in speaking to an agent. In some embodiments, this can be set to zero, or effectively have a default value of zero, so that any calls abandoning are processed for a callback.

The second parameter is the delay to initiate a callback 625. This is the time after a callback is determined to occur that the callback call should be originated. It may be desirable to wait a short time e.g., 20-30 seconds or a few minutes, so that the calling party does not receive a callback immediately after abandoning the call. In this case, it is set to one minute and 30 seconds 645. Originating a callback call too quickly can surprise the calling party, as it may not be expected so quickly, if at all. However, waiting too long, e.g., several hours, may be too late to address the caller's issue. Once the administrator is satisfied with the values, they can invoke a submit button 650 or a cancel button 655 as appropriate. Selection of the "submit" button causes the parameters to be applied to the campaign as indicated.

Identifying E-ACR Assignment Points—IVR Menus

Another embodiment of assigning an E-ACR assignment point involves associating the E-ACR processing with an IVR menu structure, or more specifically with a particular location in the IVR menu structure. An IVR menu structure, as is well known, typically offers a variety of options to the caller which are indicated by entering DTMF tones or saying a word. For example, a menu prompt may indicate to the caller: "To continue in English, press 1 or say 'English'. To continue in Spanish, press or say 'Spanish.'"

Figure 7A:
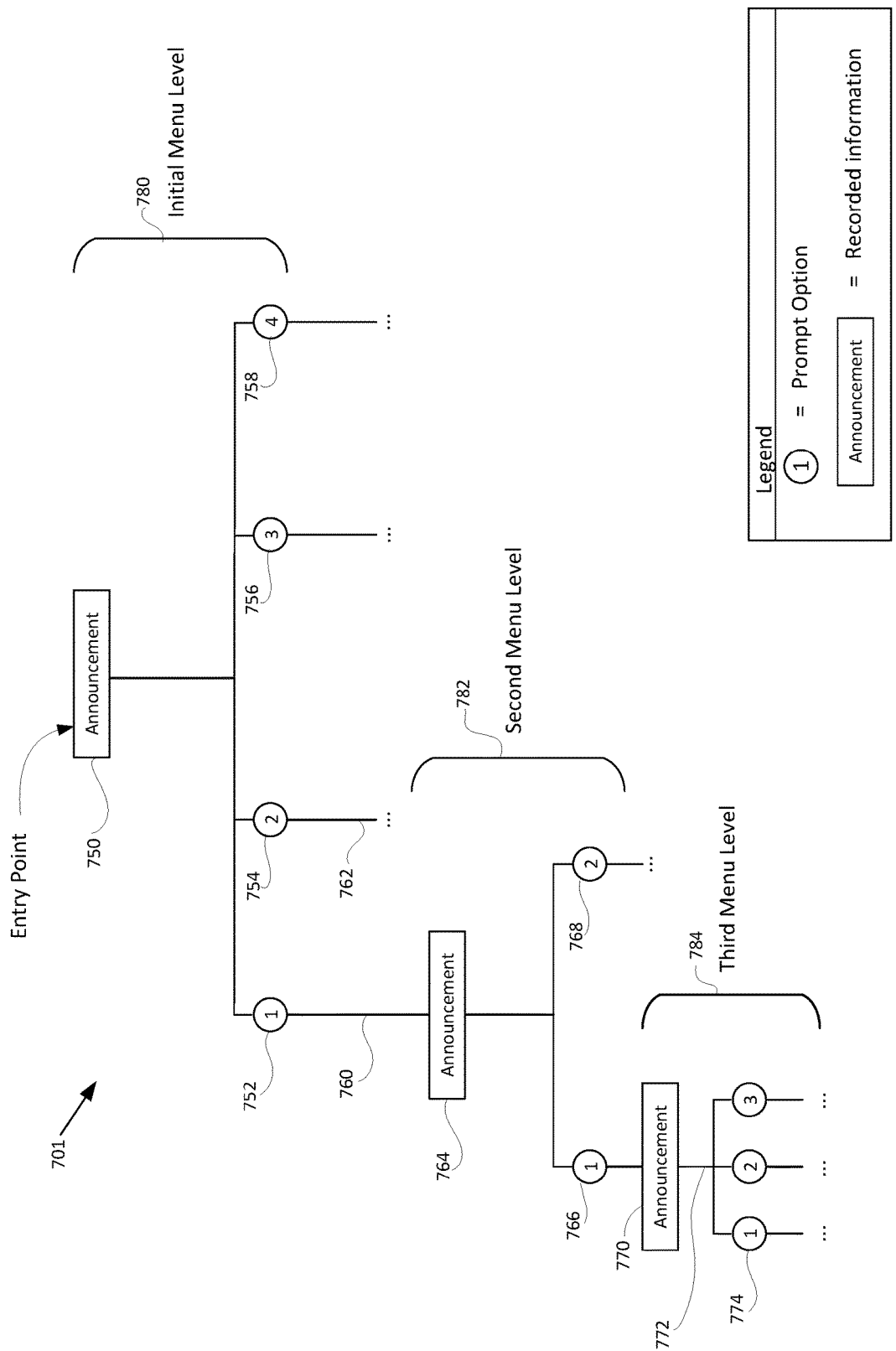
FIG. 7A introduces concepts and terminology for illustrating when an E-ACR assignment point can be defined.

To aid in establishing the meaning of terminology used herein, reference is made to FIG. 7A. FIG. 7A represents an IVR menu structure 701 in the abstract. The menu structure has a root point 750 which is the initial announcement heard by the caller. The announcement may include information in general along with various prompts for continuing in the menu structure. "Continuing" in the menu structure is also referred to as "navigating" the menu structure. In the depiction of FIG. 7A, there are four menu options 752, 754, 756, and 758 presented to the caller after the first announcement. This initial announcement 750 and prompt options 752, 754, 756, and 758 are referred to as the initial or first menu level 780.

If the caller selects the first option 752, then they are said to have elected the first branch 760. Similarly, if the caller selects the second option 754, they have elected the second branch 762, and so forth. Thus, electing the option places the caller in the corresponding branch, and takes them to a second menu level 782. There, a second menu level announcement 764 would be played, with corresponding options 766 and 768. Upon selecting the first option 766 in the second menu level, that would allow the caller to navigate to the third menu level 784.

This type of IVR menu structure is commonly known. A "sub-tending" menu level is one that is below another menu level. Thus, for example, the second menu level sub-tends the first menu level, and the third menu level sub-tends the second, etc. It is possible to select a menu option that allows the caller to jump from one menu level back up to another (but which is not illustrated in FIG. 7A).

Figure 7B:
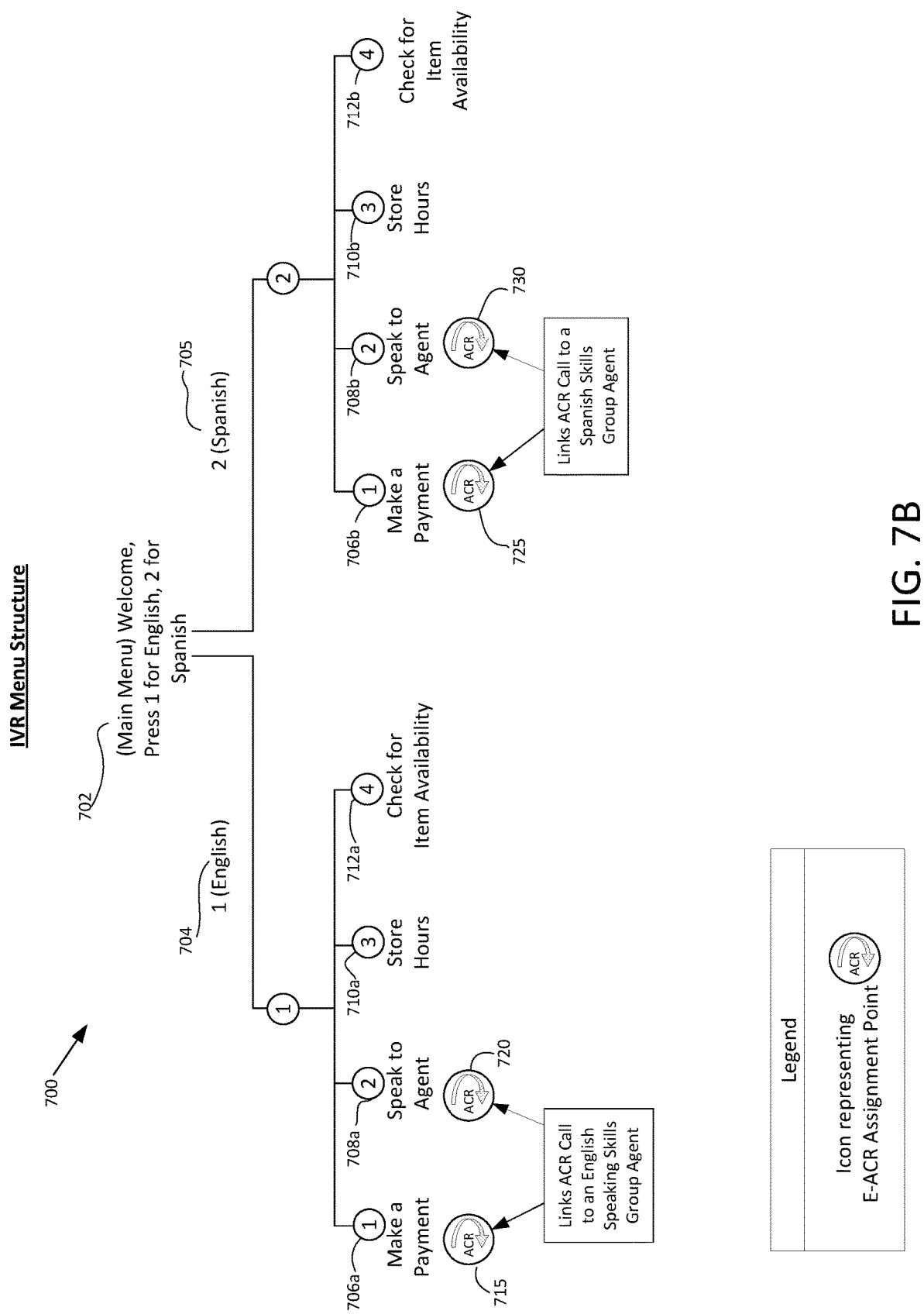
FIG. 7B illustrates one embodiment of defining an E-ACR assignment point for initiating an abandoned call recovery callback in an interactive voice response unit.

An illustration of an IVR menu structure is conceptually shown in FIG. 7B. The presentation of an IVR menu structure by an administrator can occur in various ways, including by graphically representing the menu options in a manner similar to shown in FIG. 7B. Various GUI editing tools can be used to create and edit the menu structure. Other GUI or non-GUI mechanisms may be used in conjunction with the concept and technologies disclosed herein. Thus, the concepts disclosed herein are not limited to any particular GUI or non-GUI embodiment for indicating an E-ACR assignment point in an IVR menu.

In this embodiment, the menu structure 700 is entered by a caller at the "main menu" portion 702 where a welcome greeting is typically played to the caller. Frequently, an initial choice is presented to the caller at this level as to whether they would like to continue by receiving prompts in English or Spanish. The preference is typically indicated by the caller entering a keypad entry, such as "1" 704 for English or a "2" 705 for Spanish. Alternatively, the user may say "one" or "two". Typically, the subtending menu structures are the same, regardless of which language preference is selected.

Turning to the English language selection 704 portion, the caller is presented a second level menu, that include options for: 1—make a payment 706a, 2—speak to an agent 708a, 3—store hours 710a, and 4—check for item availability 712a. There are corresponding menu options 706b, 708b, 710b, and 712b provided in Spanish language prompts. The names of each of these options are a short form of the longer announcement. For example, the phrase "store hours" represents an announcement listing the opening hours for each day of the week.

The contact center operator may decide that abandoned calls that are detected after the caller has entered "1" (make a payment) or "2" (speak to agent) warrant a potential callback. In contrast, a caller who is inquiring about store hours or item availability will not be called back if they abandon their call at that point in the menu. Obviously, once the caller enters a menu selection, it is known which topic is of interest to them, and their purpose in making the call can be determined to an extent.

An administrator can define an E-ACR assignment point by adding an icon to the menu option. In this embodiment, icons 715, 720, 725, and 730 are added to these menu options. The proximity in which the icon is placed next to the corresponding menu option indicates that the E-ACR assignment point is indicated. In other embodiments, other icons, textual indicators, colors, etc. could be used to indicate that a particular menu option has an E-ACR assignment indicated. For example, it is possible the prompt selections 706*a* or 708*a* could be illustrated using a bold font or other color to illustrate the existence of an E-ACR assignment point.

In various embodiments, the administrator could "mouse over" the icon or select the icon 715 to be informed of further information about the particular callback campaign linked to the icon. For example, mousing over or clicking the icon could open a new GUI screen for defining the parameters. This allows the administrator to further define how the callback call will be handled when originated. For example, the contact center would be interested in ensuring that payments are received, and may define icons 715 and 725 for initiating callback calls to abandoned calls at this point in the IVR menu. Icon 715 is defined as an assignment point for callbacks to callers who had selected English 704 as a language option and icon 725 is defined as an assignment point for callbacks to callers having selected Spanish 705 as a language option. Thus, a callback originated for icon 715 should be routed to English speaking agents while a callback originated for icon 725 should be routed to Spanish speaking agents. This can be accomplished by defining a callback campaign that specifies English and Spanish skills. Alternatively, two separate callback campaigns could be identified—one that is English only and the other that is Spanish only. Thus, there are different ways that distinct skills can be accommodated when selected the callback campaign.

Although a single ACR icon is shown, other embodiments may represent different campaigns or skills with different colors, names, subtext, etc. In other embodiments, icons 715 and 725 share the same symbol, but the difference in skill sets is reflected after mousing over each icon.

In this example, corresponding E-ACR processing is mirrored for both sub-menu options 1 and 2 for both English and Spanish language menu branches. In other embodiments, an E-ACR could be assigned to one, but not the other. There is no requirement that any one menu selection option must have an E-ACR assigned to it.

Figure 8:
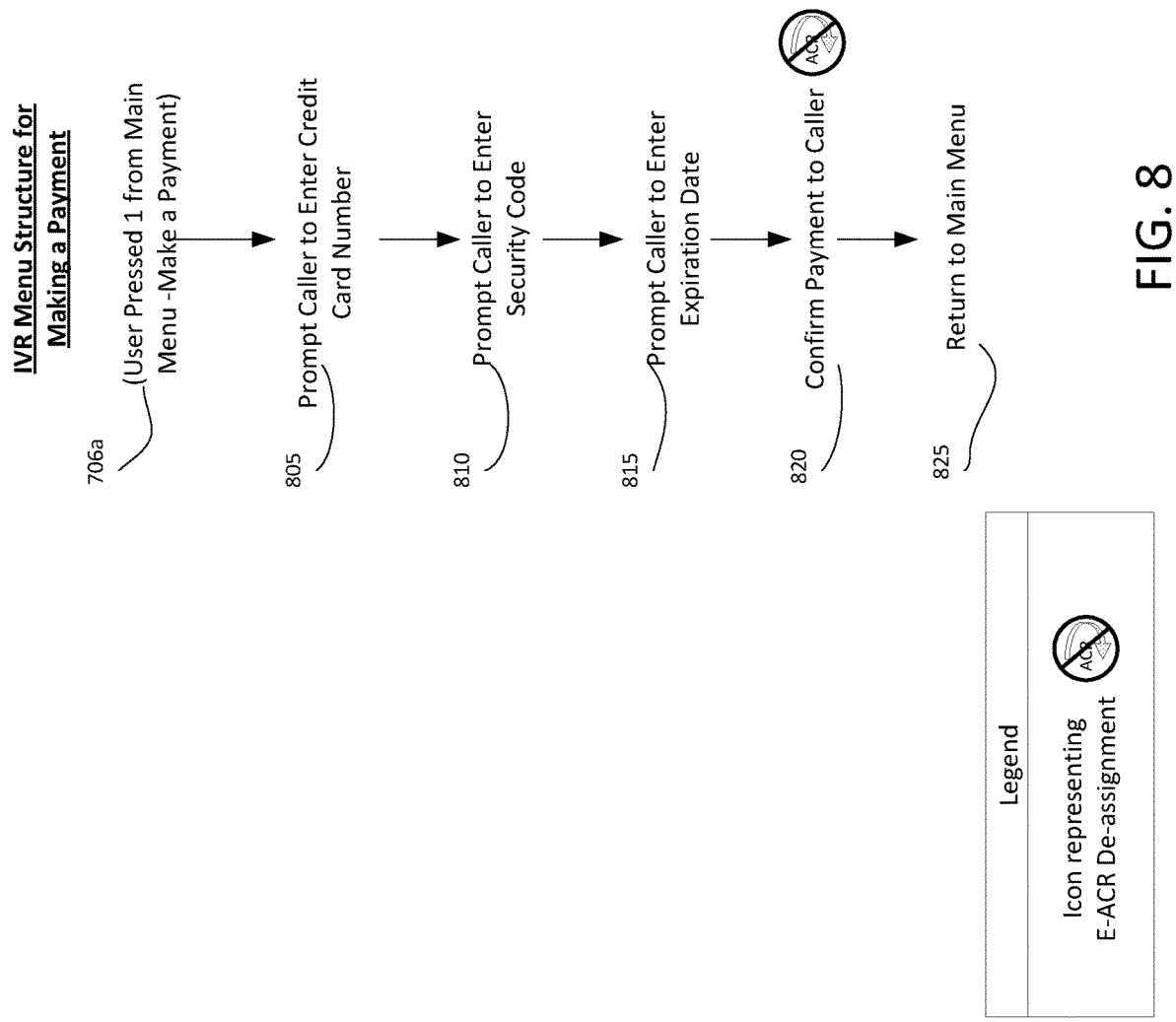
FIG. 8 illustrates one embodiment of defining deactivating an E-ACR assignment point for an abandoned call recovery callback in an interactive voice response unit.

FIG. 8 illustrates a related capability that may be defined by an administrator. While FIG. 7B allowed an administrator to assign or activate E-ACR processing at certain points in the IVR menu structure, FIG. 8 shows how the administrator can de-assign or deactivate E-ACR processing as well. The deactivation of E-ACR processing only makes sense if the E-ACR was previously activated.

The value of deactivating an E-ACR assignment can be illustrated by turning to FIG. 8. In this example, the process presumes that the caller has pressed "1" to make a payment 706*a*. Next, the caller may be prompted to enter their credit card number in operation 805. This is followed by prompting the caller to enter their security code 810 and the expiration date 815. Up to this point, the E-ACR process has been activated or assigned. Thus, if a caller enters the IVR menu, selects to make a payment, enters their credit card information and then abandons the call, a callback may occur. However, assume the caller has successfully entered all of that information and receives a prompt 820 informing that their payment has been processed. If the caller, at that point, elects to abandon the call, then the contact center may choose to not initiate a callback because the caller has successfully made a payment, and may have abandoned the call as soon as they heard the announcement confirming their payment. This behavior is typical if the caller has interacted with the IVR menu previously, and knows that at this point in the menu structure, they would merely be prompted to return to the main menu. Thus, the administrator may elect to deactivate the E-ACR in a menu option at this point. In various embodiments, the E-ACR may 'self-deactivate' once that menu option is left or exited by the caller, and the caller returns to the superseding menu option.

Figure 9:
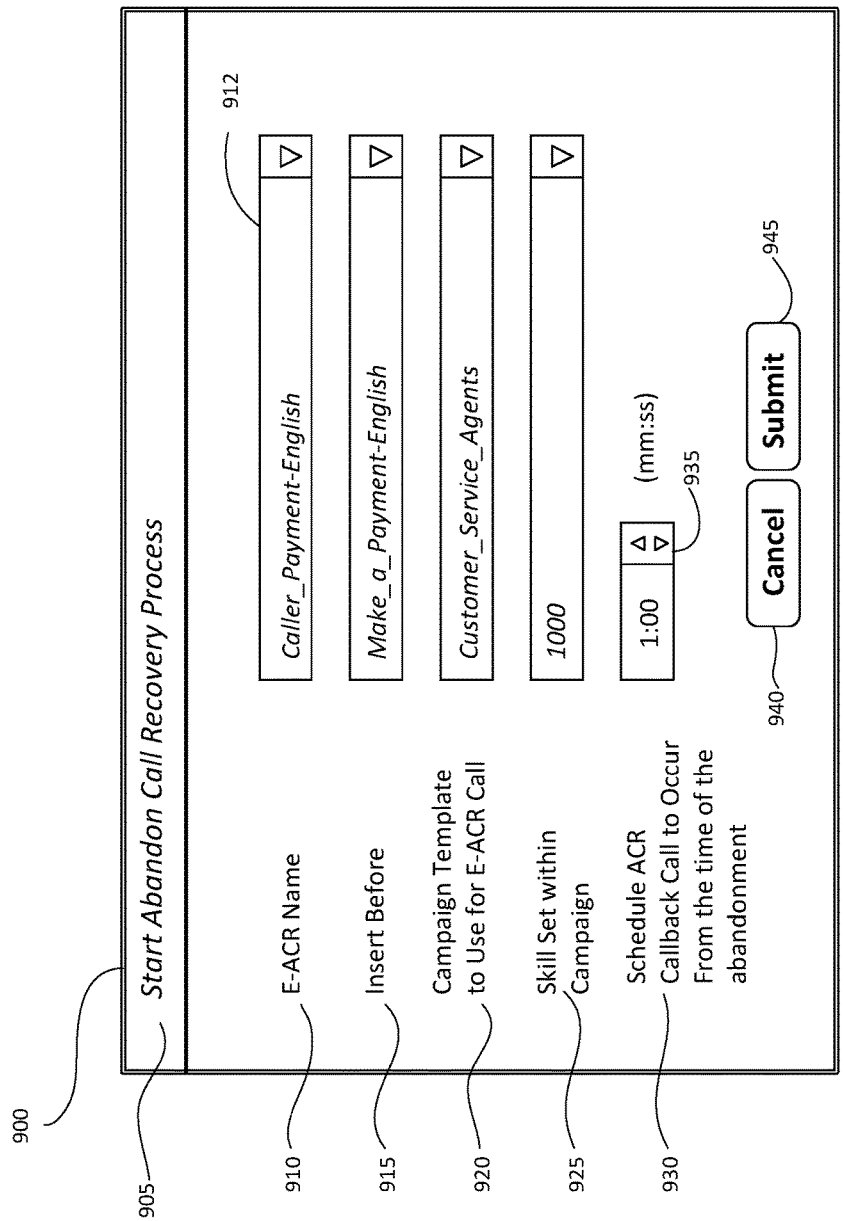
FIG. 9 represents one embodiment of a graphical user interface for indicating which campaign template to use for a callback call.

Each E-ACR assignment as reflected by the icon is linked to a GUI that allows the administrator to define parameters as to how the callback is to occur. One embodiment of a GUI for defining assignment points in an IVR menu structure is shown in FIG. 9. Turning to FIG. 9, the screen image 900 indicates in the header line 905 that it is for defining the starting of the ACR process. A name 910 is indicated that allows ready identification of this E-ACR assignment versus others. In this embodiment, the name reflects where in the IVR menu the assignment point occurs, which is "caller_payment" 912. While this suggests that the E-ACR assignment processing is unique to this menu option (i.e., different from that of IVR menu option 2, "speak to an agent"), it is possible that a common E-ACR name 910 could have been used.

The next line 915 indicates where this assignment point will occur, and indicates where the E-ACR icon is displayed in the menu hierarchy. In this case, the E-ACR is inserted at the "Make a Payment" in the English menu structure, which corresponds to icon 715 of FIG. 7B. The next line 920 indicates which callback campaign template is to be used, which in this example is the template named "Customer_Service_Agents." In this embodiment, this campaign includes all customer service agents, including those skilled in English and Spanish languages. Since this E-ACR is inserted in the English language side, the next line 925 indicates a particular skill set. The numerical value used presumably would identify English speaking agents in the customer service group. If a Spanish speaking agent were required, then a different skill set within that group could be specified. In other embodiments, the skill set can be linked to an ACD route, a DNIS, or some other construct indicated in the GUI.

Finally, the administrator may define that a qualifying abandoned call will trigger a potential callback based on the information indicated in the next line 930. In this example, the administrator can use controls 935 to set the time after an abandonment that the callback call is initiated, which in this example, reflects one minute. This is also a separate timer, which may be defined, for defining which abandoned calls are eligible, e.g., only calls that have waited above a certain threshold will cause the E-ACR procedures to be invoked. Although this GUI does not reflect that threshold timer, it could be indicated and set at this point.

Turning back to FIG. 7B, there were four instances where E-ACR assignment points are indicated. In this example, the first two icons 715, 720 could all be linked to a first E-ACR GUIs shown in FIG. 9 and the second two icons 725, 730 could be linked to a second E-ACR GUI screen (not shown). One icon may be associated with using Spanish speaking agents in the customer service group and the other icon would indicate English speaking agents in the customer service group should be used. A number of variations are possible as to how the campaigns, skills group, and E-ACR assignment points could be defined so as to provide this flexibility. However it may be accomplished, additional flexibility is afforded when the characteristics of the callback call (e.g., which skill set is identified) is linked to where in the IVR menu the call is abandoned. Thus, if the contact center operator maintained a first group agents for making a payment and another group for speaking with customers generally, then separate E-ACR assignment points could be linked to different agent groups for handling these different type of callback calls.

Callback Campaign

As mentioned earlier, each E-ACR assignment point or activation is associated with a particular callback campaign. The campaign indicates information governing how and if a callback call to the ANI will occur. For example, a callback originating from the contact center has to indicate a callback ANI of the contact center, potentially a calling name, and which group of agents is to handle the call, etc.

Further, the campaign may be used to present information to the agent receiving the call that the call is not a normal incoming call, but a callback call. Additional information may be presented to the agent as to the type of call. This information may be useful to the agent in determining how to provide the initial greeting. A normal incoming customer service call at a contact center may be answered by the agent with "ACME Company, how may I help you?" However, if the call is a callback call, such a greeting would confuse the called party, because the contact center has called the individual who previously abandoned the call. In this case, the agent may be prompted to state a different greeting, such as "Hello, this is Julie in customer service from ACME Company, and I are calling you because we noticed you had recently called us on our customer service number, but you abandoned the call before we could help you. Is there something we can help you with now?"

Exemplary Computer Processing Device

Figure 10:
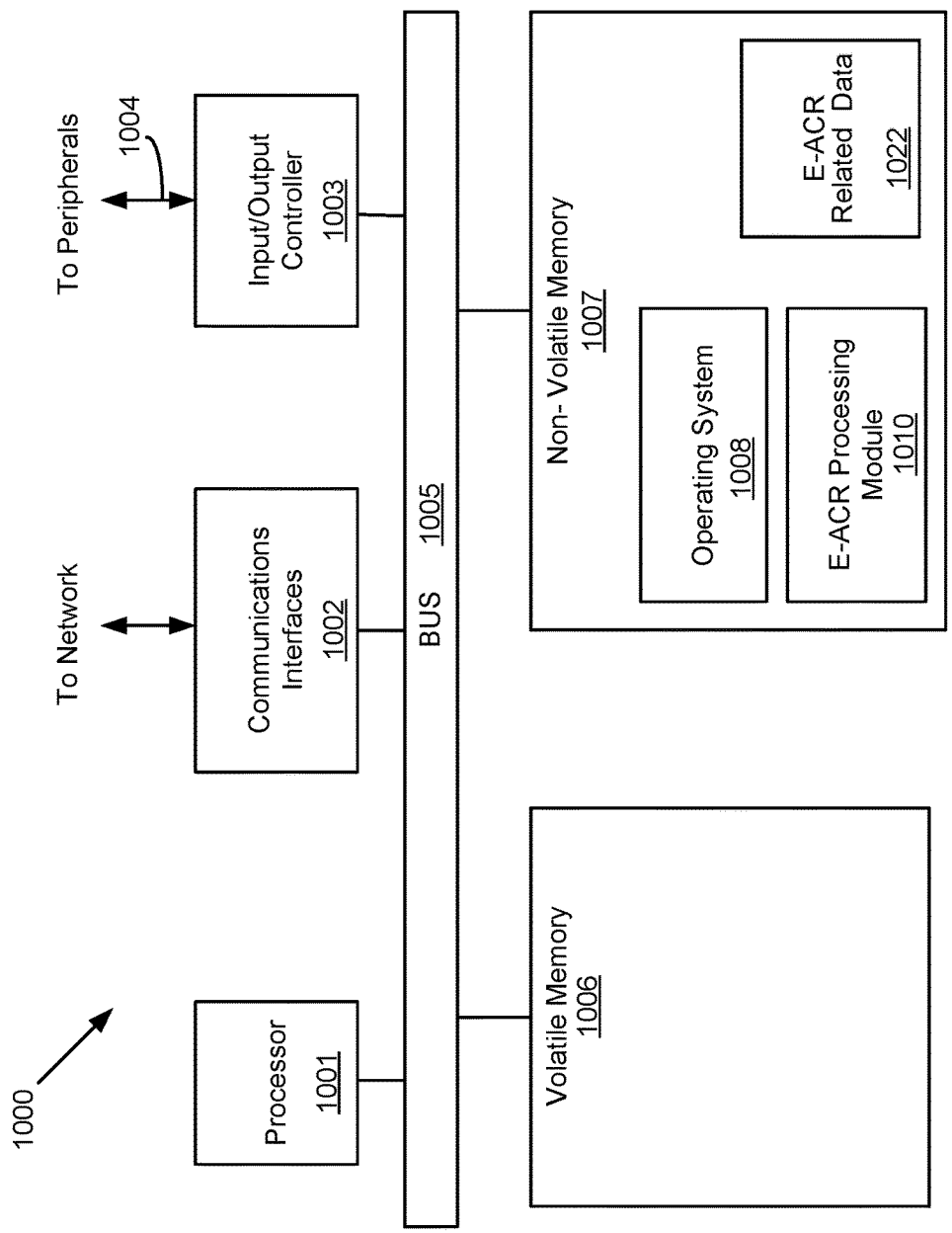
FIG. 10 illustrates one embodiment of a processing system that may be used in conjunction with the concepts and technologies presented herein.

FIG. 10 is an exemplary schematic diagram of a computer processing system that may be used in embodiments of various architectures, such as components shown in the architecture 200 of a contact center in FIG. 2 to practice the technologies disclosed herein. In general, the term "computer processing system" may be exemplified by, for example, but without limitation by any specially configured or programmed: personal computer, server, desktop computer, tablet, smart phone, notebook, laptop, distributed processing system, server, blade, and the like, as well as any combination of devices or entities adapted to perform the functions described herein, such that the resulting system is a specialized processing system configured to perform the functions and capabilities disclosed herein. The computer processing system may also be a specially configured system, designed to optimize the operation of the component in the contact center based in part on the specialized software configured to perform the functions disclosed herein. For example, the "communications handler" could be a computer processing system that is specially configured to perform the functions disclosed herein. A "communications handler" as used herein would be interpreted by one skilled in the art as a special purpose processing system, performing functions that are not typical of a generic computer. This also may be the case for the other components disclosed herein including the various dialing components, SMS gateway, RTSA components, dialing list storage systems, etc.

As shown in FIG. 10, the processing system 1000 may include one or more computing processors 1001 that may communicate with other elements within the processing system 1000 via a bus 1005. The computing processor 1001 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like. In many cases, in order to perform the necessary analysis, such as determining frequencies, energy level, etc. of the audio signal, this will requires something more than a general purpose computer processor, such as a DSP processor.

In one embodiment, the processing system 1000 may also include one or more communications interfaces 1002 for communicating data via a network (such as LAN 170 from FIG. 1) with various external devices. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1003 may also communicate with one or more input devices or peripherals using an interface such as, but not limited to: a keyboard, a mouse, a touch screen/display input, microphone, pointing device, etc. The input/output controller 1003 may also communicate with output devices or peripherals, such as displays, printers, speakers, headsets, banner displays, etc.

The computing processor 1001 may be configured to execute instructions stored in volatile memory 1006, non-volatile memory 1007, or other forms of computer readable storage media accessible to the processor 1001. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1007 may store program code and data, which also may be loaded into the volatile memory 1006 at execution time. For example, the non-volatile memory 1007 may store one or more modules 1010 that may perform the above-mentioned process flows and/or operating system code 1008 containing instructions for performing the process and/or functions associated with the technologies disclosed herein. The E-ACR processing module(s) 1010 may also access, generate, process, or store related E-ACR related data 1022, including, for example, the data described above in conjunction with performing the various aspects of E-ACR callback processing in the non-volatile memory 1007, as well as in the volatile memory 1006. This would include, but is not limited to: timer values, campaign data, assignment point data, account related data, call records, DNIS values, skill sets, or any other data used to perform the disclosed functions and concepts. The volatile memory 1006 and/or non-volatile memory 1007 may be used to store other information including, but not limited to: records, applications, programs, scripts, source code, object code, byte code, compiled code, interpreted code, machine code, executable instructions, or the like. These may be executed or processed by, for example, the computing processor 1001 and may form a part of, or may interact with, the E-ACR processing module(s) 1010. The E-ACR processing module 1010 is shown as being one module, but it may be divided into two modules which execute on different processing systems.

The technologies described herein may be implemented in various ways, including as computer program products comprising memory storing instructions causing a processor to perform the operations associated with the above technologies. The computer program product may comprise a non-transitory (tangible) computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory or propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A non-transitory computer-readable medium storing instructions that when executed cause one or more computer processors to:
receive an incoming call;
play an announcement to a caller comprising a menu selection prompt at an interactive voice response ("IVR") unit;
receive at the IVR unit a menu selection indication from the caller, wherein the menu selection indication is associated with a sub-tending menu level having an enhanced-abandoned call recovery ("E-ACR") assignment point linked to a particular skill set from among a plurality of inbound skill sets;
detect the incoming call abandons while the incoming call is associated with the sub-tending menu level; and
originate an E-ACR callback call to the caller based on a prior call history associated with the calling party number of the incoming call and based on the sub-tending menu level having the E-ACR assignment point, wherein the E-ACR callback call is associated with an agent having the particular skill set.

2. The non-transitory computer-readable medium of claim 1, wherein the instructions when executed further cause the one or more computer processors to:
originate the E-ACR callback call based on the prior call history comprising a number of prior calls from the calling party number received within a defined time period prior to the incoming call being abandoned.

3. The non-transitory computer-readable medium of claim 1, wherein the instructions when executed further cause the one or more computer processors to:
originate the E-ACR callback call to the caller after determining the prior call history comprises scheduling a prior callback based on abandonment of a prior call from the calling party number.

4. The non-transitory computer-readable medium of claim 3, wherein the prior callback has not yet occurred.

5. The non-transitory computer readable medium of claim 1, wherein the instructions when executed further cause the one or more computer processors to:
queue the caller to speak with one of the agents having the particular skill set prior to abandonment of the incoming call.

6. The non-transitory computer-readable medium of claim 5, wherein the instructions when executed further cause the one or more computer processors to:
play an announcement informing the caller to wait for one of the agents to become available.

7. The non-transitory computer-readable medium of claim 1, wherein the instructions when executed further cause the one or more computer processors to:
determine the caller has waited a minimal amount of time in a queue prior to abandoning the incoming call as a condition for originating the E-ACR callback call to the caller.

8. A method for originating an enhanced-abandoned call recovery ("E-ACR") callback call to a caller who has abandoned an incoming call while interacting with an interactive voice response ("IVR") unit, comprising:
receiving the incoming call;
playing an announcement comprising a menu selection prompt at the IVR unit;
receiving at the IVR unit a menu selection indication from the caller, wherein the menu selection indication is associated with a sub-tending menu level having an E-ACR assignment point linked to a particular skill set from among a plurality of inbound skill sets;
detecting the incoming call abandons by the IVR unit while the incoming call is associated with the sub-tending menu level; and
originating the E-ACR callback call to the caller based on a prior call history associated with the calling party number of the incoming call and based on the sub-tending menu level having the E-ACR assignment point, wherein the E-ACR callback call is associated with an agent having the particular skill set.

9. The method of claim 8, wherein the prior call history is based, in part, on a number of prior calls from the calling party number received within a defined time period prior to the incoming call being abandoned.

10. The method of claim 8, wherein the prior call history comprises scheduling a prior callback based on abandonment of a prior call from the calling party number.

11. The method of claim 10, wherein the prior callback has not yet occurred.

12. The method of claim 8, wherein prior to abandonment, the caller is queued to speak with one of the agents having the particular skill set prior to abandonment of the incoming call.

13. The method of claim 12, wherein the caller is informed to wait for one of the agents to be available.

14. The method of claim 8, wherein originating the E-ACR callback call to the caller is based in part on determining the caller waits a minimal amount of time in a queue prior to abandoning the incoming call.

15. The method of claim 8, wherein the prior call history comprises a completed sales transaction.

16. A system for originating an enhanced-abandoned call recovery ("E-ACR") callback call to a caller who has abandoned an incoming call while interacting with an interactive voice response ("IVR") menu, comprising a computer processor configured to:

receive the incoming call;

play an announcement comprising an IVR menu selection prompt;

receive an IVR menu selection indication from the caller, wherein the menu selection indication is associated with an IVR sub-tending menu level having an E-ACR assignment point linked to a particular skill set from among a plurality of inbound skill sets;

detect the incoming call abandons while the incoming call is associated with the IVR sub-tending menu level; and cause the E-ACR callback call to be originated to the caller based on a prior call history associated with the calling party number of the incoming call and based on the IVR sub-tending menu level having the E-ACR assignment point, wherein the E-ACR callback call is associated with an agent having the particular skill set.

17. The system of claim 16, wherein the computer processor is further configured to:

queue the caller to speak with one of the agents having the particular skill set prior to abandonment of the incoming call.

18. The system of claim 16, wherein the computer processor is further configured to:

determine the caller waits a minimal amount of time in a queue prior to abandoning the incoming call before causing the E-ACR callback call to be originated to the caller.

19. The system of claim 16, wherein the computer processor is further configured to:

determine a number of prior calls from the calling party number are received within a defined time period prior to the incoming call being abandoned before causing the E-ACR callback call to be originated to the caller.

20. The system of claim 16, wherein the computer processor is further configured to:

determine there is not a pending prior callback call scheduled for the caller before causing the E-ACR callback call to be originated to the caller.

* * * * *